(12) United States Patent
Bhaskar et al.

(10) Patent No.: US 12,499,999 B2
(45) Date of Patent: Dec. 16, 2025

(54) SYSTEMS AND METHODS FOR TARGETED MEDICAL DOCUMENT REVIEW

(71) Applicant: Optum, Inc., Minnetonka, MN (US)

(72) Inventors: Rahul Bhaskar, Irvine, CA (US); Mohit Singhal, Delhi (IN); Arun Kumar Tiwari, New Delhi (IN); Urvi Sharma, Greater Noida (IN); Amardeep Sharma, Ghaziabad (IN)

(73) Assignee: Optum, Inc., Minnetonka, MN (US)

( * ) Notice: Subject to any disclaimer, the term of this patent is extended or adjusted under 35 U.S.C. 154(b) by 222 days.

(21) Appl. No.: 18/190,312

(22) Filed: Mar. 27, 2023

(65) Prior Publication Data

US 2024/0331867 A1   Oct. 3, 2024

(51) Int. Cl.
  *G16H 50/30* (2018.01)
  *G16H 10/60* (2018.01)
  *G16H 15/00* (2018.01)

(52) U.S. Cl.
  CPC ............. *G16H 50/30* (2018.01); *G16H 10/60* (2018.01); *G16H 15/00* (2018.01)

(58) Field of Classification Search
  CPC ........ G16H 50/30; G16H 10/60; G16H 15/00; G16H 10/20; G16H 40/20; G06N 20/00
  USPC ........................................................ 705/2, 3
  See application file for complete search history.

(56) References Cited

U.S. PATENT DOCUMENTS

| | | | |
|---|---|---|---|
| 11,373,248 B1* | 6/2022 | Criswell | G06Q 40/08 |
| 2008/0086327 A1 | 4/2008 | Cox et al. | |
| 2012/0329015 A1 | 12/2012 | Thesman | |
| 2015/0317743 A1 | 11/2015 | Flam et al. | |
| 2016/0357920 A1* | 12/2016 | Thesman | G06F 3/04842 |
| 2018/0182474 A1 | 6/2018 | Erdmann et al. | |
| 2019/0051389 A1 | 2/2019 | Meittunen et al. | |
| 2019/0371472 A1* | 12/2019 | Blanchard | G16H 10/60 |
| 2020/0265935 A1* | 8/2020 | Thesman | G16H 15/00 |
| 2023/0352187 A1* | 11/2023 | Schaper | G16H 50/20 |

OTHER PUBLICATIONS

Li et al. "Comparison of the performance of the CMS Hierarchical Condition Category (CMS-HCC) risk adjuster with the charlson and elixhauser comorbidity measures in predicting mortality" (Year: 2010).*

* cited by examiner

*Primary Examiner* — Alaaeldin M. Elshaer
(74) *Attorney, Agent, or Firm* — Bookoff McAndrews, PLLC

(57) ABSTRACT

Systems and methods for targeted medical document review are disclosed. A list of medical documents is received. Each medical document is associated with a user enrolled in a plan subject to a medical document review process. A dataset for each medical document, including clinical data, membership data, and provider data associated with the user, is received. A first model is used to determine whether each medical document includes an undocumented condition based on the dataset. The list is reduced to a subset of medical documents determined to include an undocumented condition. A second model is used to determine a risk score associated with each medical document of the subset based on the dataset. The subset of medical documents are ordered in the reduced list based on the risk scores. The ordered, reduced list is provided as input to the medical document review process.

20 Claims, 8 Drawing Sheets

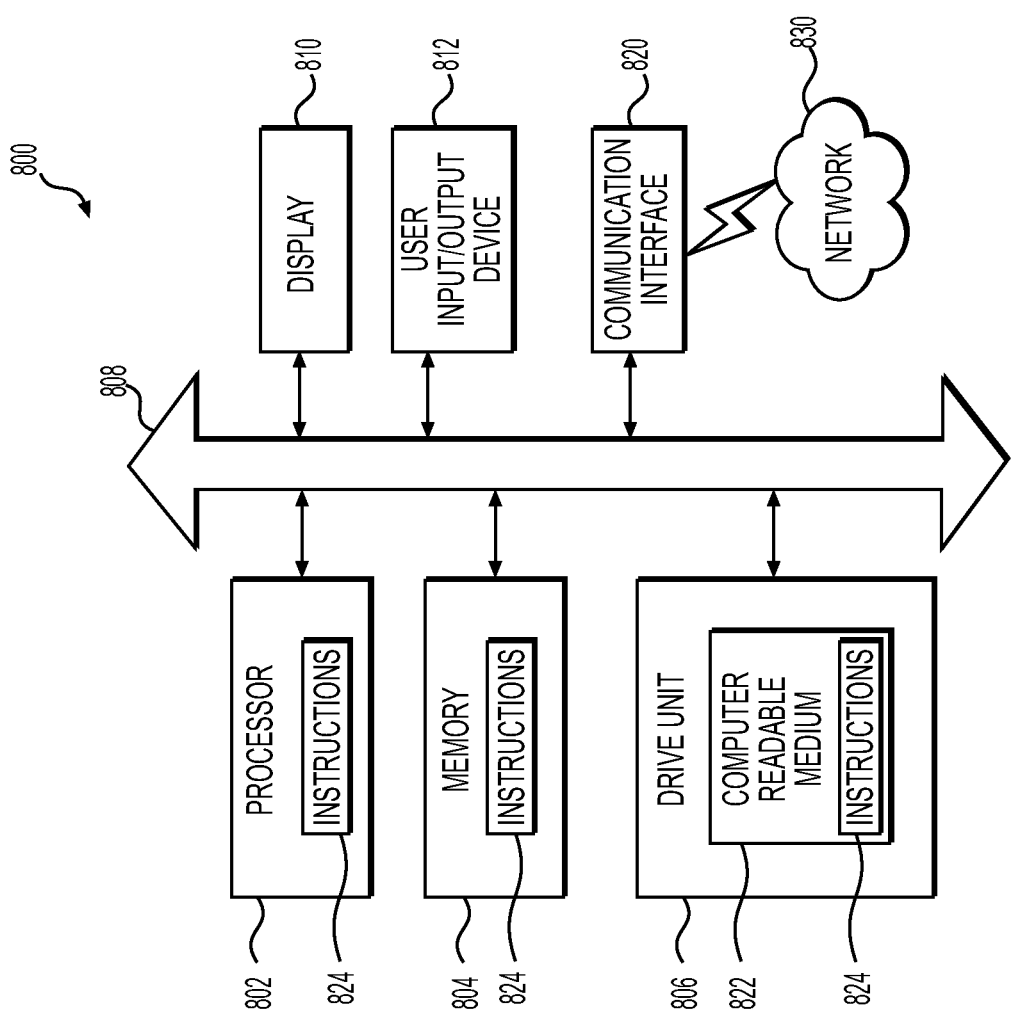

SYSTEMS AND METHODS FOR TARGETED MEDICAL DOCUMENT REVIEW

TECHNICAL FIELD

The present disclosure relates generally to systems and methods for targeted medical document review, and more particularly, to systems and methods for determining a subset of medical documents that include an undocumented condition, and ordering the medical documents within the subset based on a determined risk score to prioritize retrieval and processing of the medical documents including high risk conditions.

BACKGROUND

Payers in the healthcare industry providing Medicare Advantage plans to members must periodically document and submit member information, including one or more hierarchical condition categories (HCCs) associated with each of the enrolled members, to the Centers for Medicare and Medicaid Services (CMS). HCCs are codes that correspond to one or more diagnoses of the enrolled members. CMS utilizes this documented information to project the expected risk and future annual cost of care for each of the enrolled members, which is further used to determine payments to the Medicare Advantage plans.

Conventional documentation of HCCs to CMS is performed via a combination of one or more prospective documentation processes and a retrospective review process to fill any documentation gaps that remain. The retrospective review process typically involves the retrieval and processing of millions of medical documents associated with the enrollees, including medical charts, clinical notes, and admission and/or discharge summaries from healthcare providers, to identify HCCs included in the medical documents that have not been previously documented through the prospective documentation processes (e.g., to identify undocumented HCCs). However, out of the millions of medical documents that are retrieved and processed, a significant majority (e.g., 85-90%) of the medical documents do not include any HCCs or include HCCs that have already been identified and documented.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

The techniques of this disclosure improve the state of retrospective medical document review processes, and particularly for retrospective medical document review processes associated with HCC documentation to CMS. In one aspect, methods for targeted medical document review performed by one or more processors of a computing device are disclosed herein. An example method includes receiving a list of a plurality of medical documents, where each medical document is associated with a respective user of a plurality of users enrolled in a plan for which a medical document review process is performed, and receiving a dataset for each medical document of the plurality of medical documents, the dataset including clinical data, membership data, and provider data associated with the respective user. The method also includes, for each medical document of the plurality of medical documents, determining, using a trained first machine learning model, whether the medical document includes an undocumented condition based on the dataset for the medical document, and reducing the list to a subset of the plurality of medical documents determined to include an undocumented condition. The method further includes for each medical document of the subset of the plurality of medical documents, determining, using a trained second machine learning model, a risk score associated with the medical document based on the dataset for the medical document, ordering the subset of the plurality of medical documents in the reduced list based on the determined risk score for each medical document of the subset, and providing the ordered, reduced list as an input to the medical document review process.

In accordance with another aspect, systems for target medical document review are disclosed herein. An example system includes one or more processors, and at least one memory storing instructions that, when executed by the one or more processors, cause the one or more processors to perform operations. The operations include receiving a list of a plurality of medical documents, where each medical document is associated with a respective user of a plurality of users enrolled in a plan for which a medical document review process is performed, and receiving a dataset for each medical document of the plurality of medical documents, the dataset including clinical data, membership data, and provider data associated with the respective user. The operations also include, for each medical document of the plurality of medical documents, determining, using a trained first machine learning model, whether the medical document includes an undocumented condition based on the dataset for the medical document, and reducing the list to a subset of the plurality of medical documents determined to include an undocumented condition. The operations further include for each medical document of the subset of the plurality of medical documents, determining, using a trained second machine learning model, a risk score associated with the medical document based on the dataset for the medical document, ordering the subset of the plurality of medical documents in the reduced list based on the determined risk score for each medical document of the subset, and providing the ordered, reduced list as an input to the medical document review process.

In accordance with a further aspect, non-transitory computer readable media for targeted medical document review are disclosed herein. An example non-transitory computer readable medium stores instructions which, when executed by one or more processors, cause the one or more processors to perform operations. The operations include receiving a list of a plurality of medical documents, where each medical document is associated with a respective user of a plurality of users enrolled in a plan for which a medical document review process is performed, and receiving a dataset for each medical document of the plurality of medical documents, the dataset including clinical data, membership data, and provider data associated with the respective user. The operations also include, for each medical document of the plurality of medical documents, determining, using a trained first machine learning model, whether the medical document includes an undocumented condition based on the dataset for the medical document, and reducing the list to a subset of the plurality of medical documents determined to include an undocumented condition. The operations further include for each medical document of the subset of the plurality of medical documents, determining, using a trained second machine learning model, a risk score associated with the medical document based on the dataset for the medical document, ordering the subset of the plurality of medical documents in the reduced list based on the determined risk score for each medical document of the subset, and providing the ordered, reduced list as an input to the medical document review process.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

FIG. 8 shows an implementation of a computer system that executes techniques presented herein, according to some embodiments of the disclosure.

DETAILED DESCRIPTION

Figure 1:
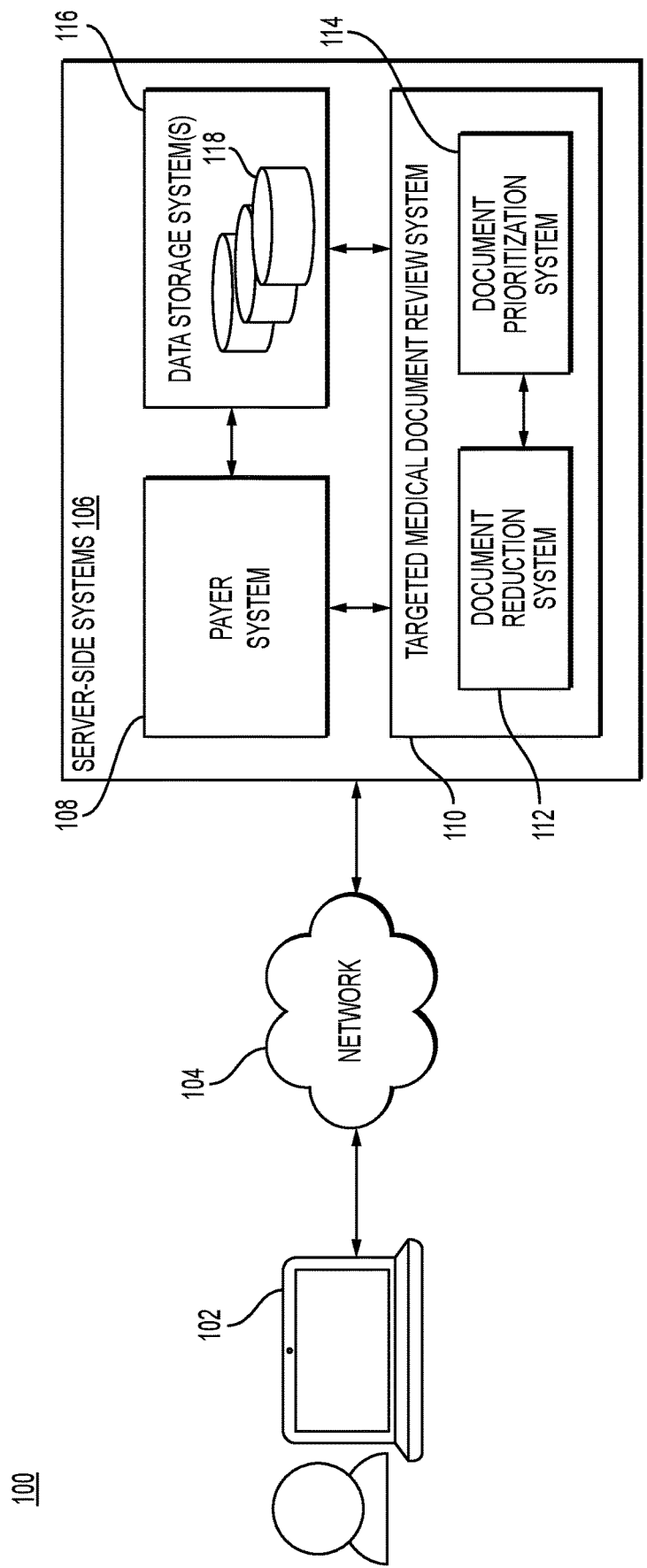
FIG. 1 is a diagram showing an example of an environment for targeted medical document review, according to some embodiments of the disclosure.

As briefly mentioned above, conventional payer documentation of HCCs of Medical Advantage plan enrollees to CMS is performed via a combination of one or more prospective documentation processes and a retrospective review process to fill any documentation gaps that remain. The retrospective review process typically involves the retrieval and processing of millions of medical documents to identify undocumented HCCs. For example, a list is prepared by the payer that identifies one or more medical documents for each of the plan enrollees to be reviewed. All of the medical documents in the list are retrieved and processed (e.g., coded) by a medical coding team to identify any undocumented HCCs included in the medical documents for documentation to CMS.

The conventional retrieval and processing of the medical documents is a semi-automated process that can include downloading the medical documents from a remote storage location to a local computing device and/or scanning paper medical documents for uploading to the local computing device, performing optical recognition techniques on the medical documents to prepare the medical documents for processing by the medical coding team, etc., which consumes an exorbitant amount of computing resources when performed for such a large volume of medical documents. This computing resource intensive retrieval and processing is particularly inefficient and wasteful given that, out of the millions of medical documents that are retrieved and processed, a significant majority (e.g., 85-90%) of the medical documents typically do not include any HCCs or include HCCs that have already been identified and documented through one of the prospective documentation processes.

Additionally, the conventional retrospective review process is time intensive, resulting in a several month lag before the documentation gaps are filled in to obtain complete and accurate HCC documentation. For members having an undocumented HCC that is associated with a high risk condition or diagnosis, the several month lag that it takes for the retrospective review process to be completed and the undocumented HCC to be identified, can result in the high risk condition or diagnoses increasing in severity and/or results in a lost opportunity to provide preventative care for the member.

The present disclosure solves this problem and/or other problems described above or elsewhere in the present disclosure, namely by improving a state of the retrospective review process by providing targeted medical document review. The targeted medical document review uses a two-model approach that is performed prior to retrieving any medical documents. For example, the list of medical documents to be reviewed is reduced to a subset of the medical documents that are predicted to include an undocumented condition using a first trained machine learning model. The medical documents within the subset are then ordered within the reduced list based on risk scores predicted for the medical documents using a second trained machine learning model. The ordered, reduced list is provided as input to a medical document review process to prioritize the retrieval, processing, and associated documentation for those medical documents within the subset that include undocumented conditions of higher risk (e.g., indicated by a higher risk score).

Compared to the conventional retrospective review processes that involve the retrieval and processing of every medical document included in the list, by providing the ordered, reduced list as input to guide the medical document review process, only the subset of the medical documents predicted to include undocumented conditions (e.g., only relevant medical documents) are retrieved for processing and documentation. Therefore, a significantly lesser volume of medical documents are retrieved and processed as part of the medical document review process, which conserves or prevents the waste of computing resources conventionally used to retrieve (e.g., download or upload) and prepare every medical document, of which a large majority are irrelevant as they do not include undocumented conditions, for subsequent processing.

Additionally, prioritizing the medical documents within the subset that are associated with the highest risk for retrieval, processing, and documentation in the medical document review process may enable earlier identification and documentation of higher risk undocumented conditions. For example, using the two-model approach for targeted medical document review, the higher risk undocumented conditions can be identified and documented about 3-4 months earlier than if a conventional medical document review process was performed. Earlier identification and documentation may provide improved healthcare management to the users enrolled in the plan by, for example, providing proactive and holistic care interventions to prevent incidents and/or episodes that could have occurred had the undocumented condition not been detected early in the medical document review process.

While specific examples included throughout the present disclosure involve targeted medical document review associated with payer documentation of HCCs of Medicare Advantage plan enrollees to CMS, it should be understood that techniques according to this disclosure may be adapted to other types of medical document review processes associated with different plans and/or different documentation authorities. It should also be understood that the examples above are illustrative only. The techniques and technologies of this disclosure may be adapted to any suitable activity.

Presented below are various aspects of machine learning techniques that can be adapted for determining whether a medical document includes an undocumented condition and/or determining a risk score associated with a medical document. As will be discussed in more detail below, the machine learning techniques include one or more aspects according to this disclosure, e.g., a particular selection of training data, a particular training process for a machine learning model, operation of the machine learning model in conjunction with particular data, modification of such particular data by the machine learning model, and/or other aspects that are apparent to one of ordinary skill in the art based on this disclosure.

FIG. 1 is a diagram showing an example of an environment 100 for targeted medical document review, according to some embodiments of the disclosure. A client device 102 associated with a medical document review team member communicates with one or more other components of the environment 100 across a network 104, including one or more server-side systems 106. The server-side systems 106 include a payer system 108, a targeted medical document review system 110, and/or one or more data storage system(s) 116, among other systems. In some examples, the targeted medical document review system 110 includes a document reduction system 112 and a document prioritization system 114. The data storage system(s) 116 include one or more data stores 118.

In some examples, the payer system 108, the targeted medical document review system 110, and/or the data storage system(s) 116 are associated with a common entity, e.g., a common payer or health plan provider, such as a health insurance company or the like offering private and/or public health care plans to individuals and/or families. In such examples, the payer system 108, the targeted medical document review system 110, and/or the data storage system(s) 116 can be part of a cloud service computer system (e.g., in a data center). That is, the various systems can be components or subsystems of a larger computer system. In other examples, one or more of the payer system 108, the targeted medical document review system 110, and/or the data storage system(s) 116 are separate systems associated with different entities. In such examples, each of the separate systems are communicatively connected to one another over the network 104 (e.g., via an application programming interface (API)). The systems and devices of the environment 100 can communicate in any arrangement. As will be discussed herein, systems and/or devices of the environment 100 communicate in order to facilitate targeted medical document review.

The client device 102 is configured to enable the medical document review team member to access and/or interact with other systems in the environment 100. In some examples, the medical document review team member is associated with (e.g., is an employee or contractor of) the health plan provider and is responsible for performing a medical document review process for one or more of the plans provided by the health plan provider. For example, the client device 102 is a computer system such as, for example, a desktop computer, a laptop computer, a tablet, a smart cellular phone, a smart watch, or other wearable computer, etc. The client device 102 includes one or more applications, e.g., a program, plugin, browser extension, etc., installed on a memory of the client device 102. The applications can include one or more of system control software, system monitoring software, software development tools, etc.

In some embodiments, at least one of the applications is associated and configured to communicate with one or more of the other components in the environment 100, such as one or more of the server-side systems 106. For example, the at least one application can be executed on the client device 102 to communicate with the payer system 108 (e.g., a system of the health plan provider) to request generation of a list of medical documents associated with the medical document review process for input to the targeted medical document review system 110. For example, the medical documents in the generated list include one or more medical documents associated with each of a plurality of users enrolled in a plan provided by the healthcare provider for which the medical document review process is to be performed. One example plan is a Medicare Advantage plan, which requires HCCs of enrollees to be documented to CMS. HCCs are codes defined by CMS that correspond to one or more diagnoses or conditions of the user. The medical documents are identified within the list based on metadata (e.g., a file name, a file property, a storage location) of the documents or other similar identifying information. In one embodiment, the medical documents themselves have not yet been retrieved for the medical document review process.

The at least one application can then receive, from the payer system 108, an ordered, reduced list output from the targeted medical document review system 110 for use in (e.g., as input to) the medical document review process. As described in detail below, the ordered, reduced list includes a subset of the medical documents initially included in the list that are determined to include an undocumented condition. Additionally, the medical documents are ordered within the subset based on determined risk scores to facilitate prioritized retrieval, processing, and documentation of higher risk medical documents including undocumented conditions (e.g., indicated by the determined risk scores) in the medical document review process.

Additionally, one or more components of the client device 102, such as the at least one application, generate, or cause to be generated, one or more graphic user interfaces (GUIs) based on instructions/information stored in the memory, instructions/information received from the other systems in the environment 100, and/or the like and cause the GUIs to be displayed via a display of the client device 102. The GUIs can be, e.g., mobile application interfaces or browser user interfaces and include text, input text boxes, selection controls, and/or the like. In some examples, the display includes a touch screen or a display with other input systems (e.g., a mouse, keyboard, etc.) to control the functions of the client device 102.

The payer system 108 includes one or more server devices (or other similar computing devices) for executing services associated with a payer or health plan provider, such as an insurance company or other similar organization. The services can include both user-facing services as well as internal services, such as compliance related-documentation services. Continuing with the example above, the payer or health plan provider associated with the payer system 108 offers the Medicare Advantage plan, for which the medical document review process is performed to document HCCs of enrollees of the plan to CMS to maintain compliance.

In some examples, the targeted medical document review system 110 is a system of (e.g., is hosted by) the same payer or health plan provider associated with the payer system 108. In such examples, the targeted medical document review system 110 can be a sub-system or component of the payer system 108. In other examples, the targeted medical document review system 110 is a system of (e.g., is hosted by) a third party that provides targeted medical document review services to the payer or health plan provider associated with the payer system 108.

The document reduction system 112 of the targeted medical document review system 110 includes one or more server devices (or other similar computing devices) for executing reduction processes. As described in detail elsewhere herein, example reduction processes include: using a first trained machine learning model to determine, from the medical documents included in the above-described list, a subset of the medical documents that include an undocumented condition; reducing the list to include only the subset of the medical documents; and providing the reduced list as input to one or more other processes. For example, the reduced list can be provided to the document prioritization system 114 for further processing. Additionally or alternatively, the reduced list can be provided as input to the medical document review process.

The document prioritization system 114 includes one or more server devices (or other similar computing devices) for executing ordering processes. As described elsewhere herein, example ordering processes include: using a second trained machine learning model to determine risk scores associated with the subset of medical documents included in the reduced list (e.g., medical documents determined to have an undocumented condition); ordering the subset of medical documents based on the determined risk scores within the reduced list; and providing the ordered, reduced list as input to one or more other processes. For example, the ordered, reduced list is provided as input to the medical document review process to prioritize retrieval, processing, and documentation of those medical documents within the subset having higher risk scores indicative of higher risk conditions.

The data storage system(s) 116 each include a server system or computer-readable memory such as a hard drive, flash drive, disk, etc. The data stores 118 of the data storage system(s) 116 include and/or act as a repository or source for various types of health plan- and/or healthcare-related data associated with each of the plurality of users enrolled in the plan. For example, each of the data stores 118 can store one or more types of the health plan- and/or healthcare-related data associated with each of the plurality of users enrolled in the plan. Example data types includes, clinical data, membership data, and/or provider data, among other similar data types.

In some examples, one of the data storage system(s) 116 maintains each of the data stores 118. In other examples, one or more of the data stores 118 are maintained across two or more different ones of the data storage system(s) 116. One or more of the data storage system(s) 116 can be a system of (e.g., hosted by) the same health plan provider associated with the payer system 108 and/or targeted medical document review system 110. Additionally or alternatively, one or more of the data storage system(s) 116 are associated with a third party that provides data storage services to the payer system 108 and/or targeted medical document review system 110.

Example types of the clinical data associated with a respective user include suspect data, laboratory data, pharmaceutical data, and/or metadata of one or more medical documents of the respective user, each described in greater detail elsewhere herein. The clinical data is received or collected from one or more external resources, such as healthcare provider systems, laboratory systems, pharmaceutical systems, or other similar systems. The clinical data is stored in association with an identifier of the user (e.g., a plan account number or other similar identifier).

The membership data includes health plan information associated with each of the plurality of users. Example health plan information includes claims data, monthly membership record (MMR) data, and model output report (MOR) data, each described in greater detail elsewhere herein. The health plan information is received or collected from the payer system 108 and/or from external resources, such as CMS. Similar to the clinical data, the health plan information is stored in association with the identifier of the user.

The provider data includes information associated with healthcare providers of the plurality of users. Example healthcare provider information includes demographic data and/or behavioral data of the healthcare providers, each described in greater detail elsewhere herein. The healthcare provider information is received or collected from the payer system 108 and/or from external sources, such as the healthcare providers or third party services that collect and/or analyze demographic data and/or behavioral data of the healthcare providers. Similar to the clinical data, the healthcare provider information is stored in association with the identifier of the user. Additionally, the healthcare provider information can be stored in association with a particular medical document. For example, the healthcare provider information stored in association with the identifier of the user can be tagged with metadata of the document (e.g., a file name, a file property, a storage location, or other similar identifying information).

In some examples, one or more additional types of data are retrieved and stored in one or more or data stores of the data storage system(s) 116. As one example, social determinants of health data (SDoH) data is collected and stored for each of the plurality of users. As another example, data from one or more prospective programs is collected and stored. The data includes conditions (e.g., HCCs) that have already been documented using prospective documentation processes implemented by the prospective programs for one or more of the plurality of users. Example prospective programs include Housecall, In-office Assessment, and Telehealth.

Further, at least one of the data stores 118 stores one or more trained models that are retrieved and executed by the targeted medical document review system 110 to facilitate targeted medical document review. For example, the trained models include a trained first machine learning model used to determine a presence or absence of an undocumented condition included in a medical document. The trained first machine learning model is implemented by the document reduction system 112 to enable a reducing of a list of medical documents to a subset of the medical documents determined to include at least one undocumented condition. The trained models also include a trained second machine learning model used to determine a risk score associated with a medical document determined (e.g., by the trained first machine learning model) to include an undocumented condition. The trained second machine learning model is implemented by the document prioritization system 114 to enable an ordering of the medical documents determined to include at least one undocumented condition within the subset based on the determined risk scores.

The network 104 over which the one or more components of the environment 100 communicate includes one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 104 includes the Internet, and information and data provided between various systems occurs online. "Online" means connecting to or accessing source data or information from a location remote from other devices or networks coupled to the Internet. Alternatively, "online" refers to connecting or accessing a network (wired or wireless) via a mobile communications network or device. The Internet is a worldwide system of computer networks-a network of networks in which a party at one computer or other device connected to the network can obtain information from any other computer and communicate with parties of other computers or devices. The client device 102 and one or more of the server-side systems 106 are connected via the network 104, using one or more standard communication protocols. The client device 102 and the one or more of the server-side systems 106 transmit and receive communications from each other across the network 104.

Although depicted as separate components in FIG. 1, it should be understood that a component or portion of a component in the system of the environment 100 is, in some embodiments, integrated with or incorporated into one or more other components. As one example, the document reduction system 112 and document prioritization system 114 can be integrated into a single component or sub-system of the targeted medical document review system 110. As another example, the targeted medical document review system 110 and/or one or more of the data storage system(s) 116 can be integrated with the payer system 108 or the like. In some embodiments, operations or aspects of one or more of the components discussed above are distributed amongst one or more other components. Any suitable arrangement and/or integration of the various systems and devices of the environment 100 can be used.

In the following disclosure, various acts are described as performed or executed by a component from FIG. 1, such as the client device 102 or one or more of the server-side systems 106, or components thereof. However, it should be understood that in various aspects, various components of the environment 100 discussed above execute instructions or perform acts including the acts discussed below. An act performed by a device is considered to be performed by a processor, actuator, or the like associated with that device. Further, it should be understood that in various embodiments, various steps can be added, omitted, and/or rearranged in any suitable manner.

Figure 2:
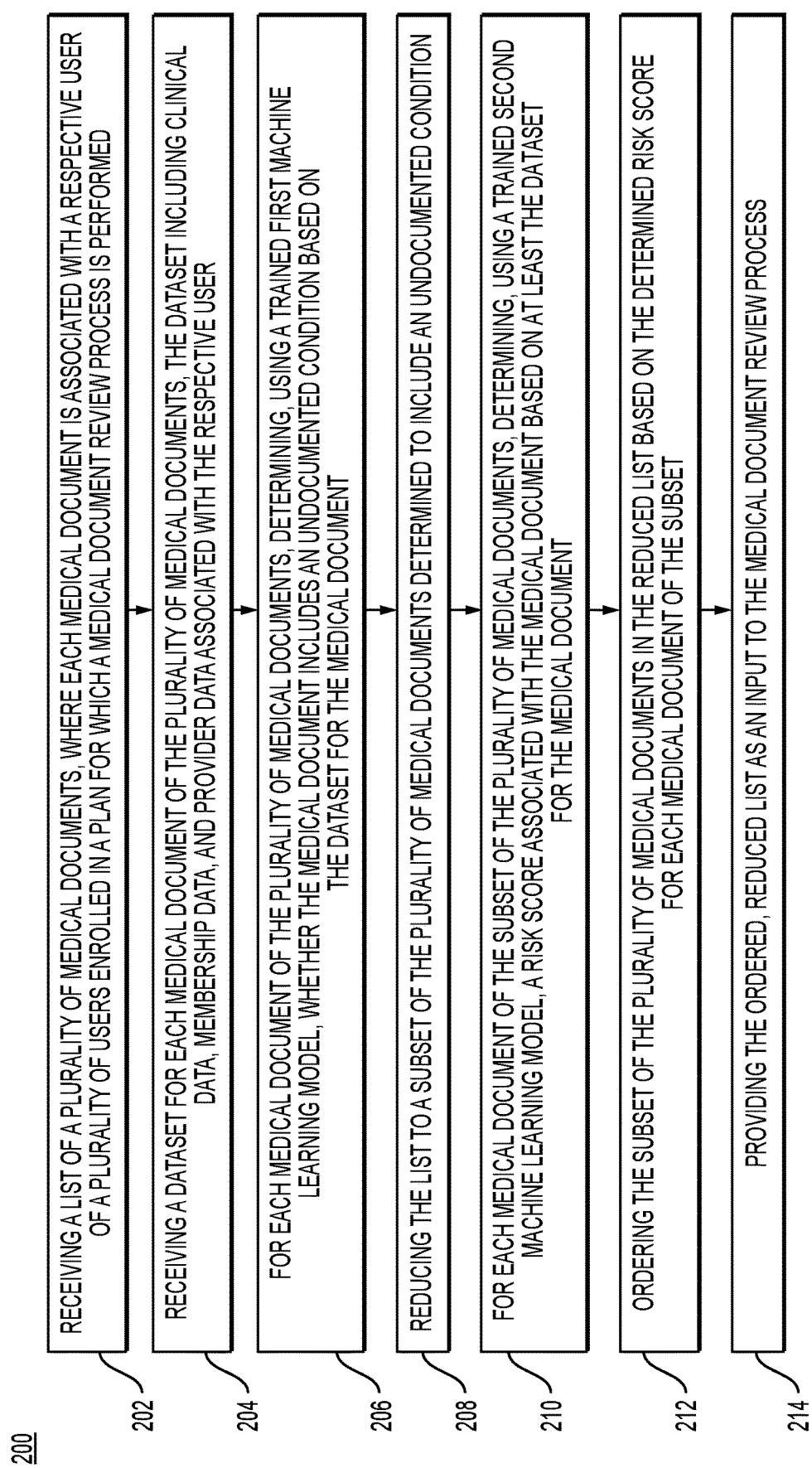
FIG. 2 is a flow chart showing an example of a process for targeted medical document review using a two-model approach, according to some embodiments of the disclosure.
Figure 3:
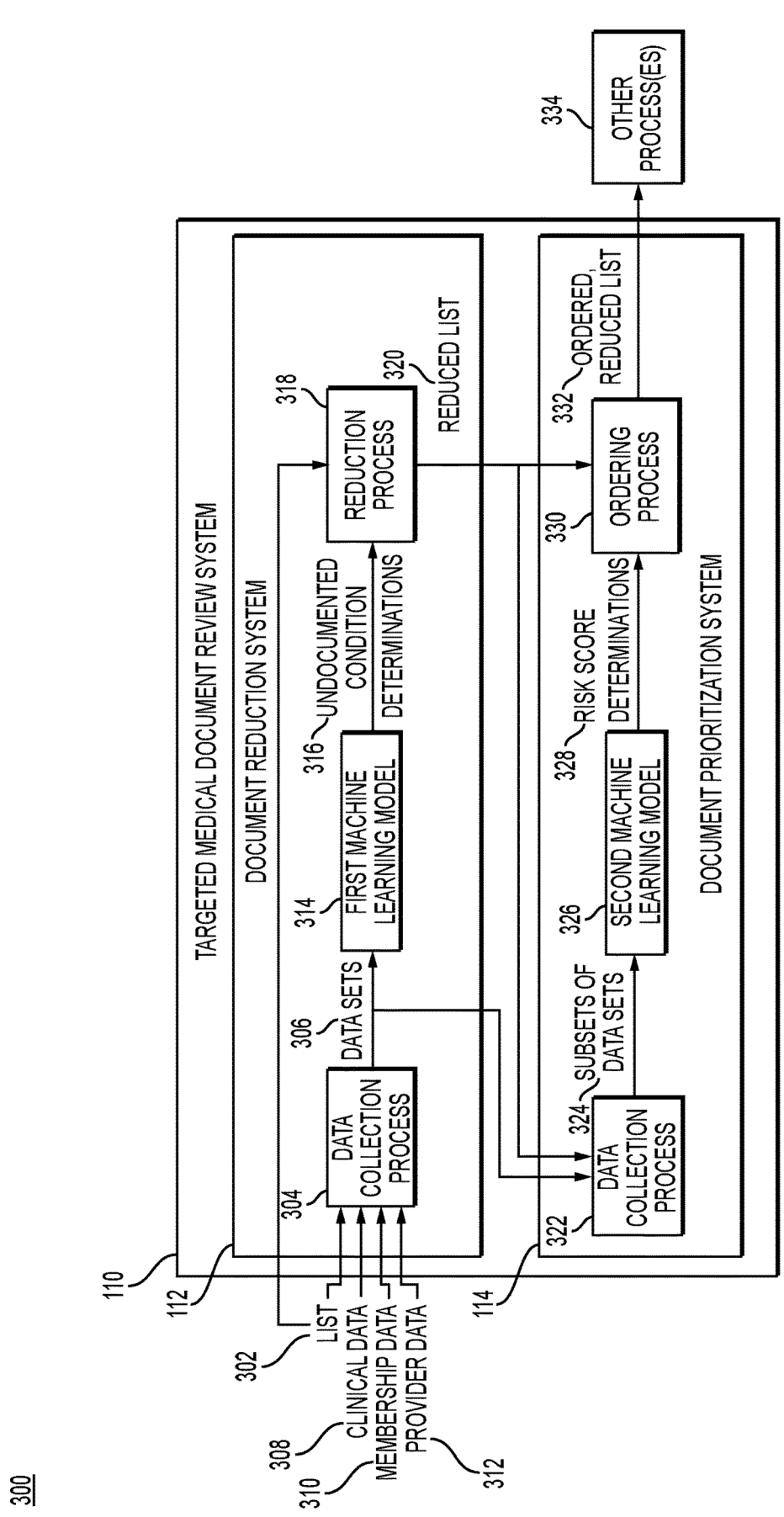
FIG. 3 is a system flow diagram conceptually showing the process of FIG. 2 performed by components of the environment of FIG. 1, according to some embodiments of the disclosure.

FIG. 2 is a flow chart showing an example of a process 200 for targeted medical document review using a two-model approach, according to some embodiments of the disclosure. FIG. 3 is a system flow diagram 300 conceptually showing the process 200 of FIG. 2 performed by one or more components of the environment of FIG. 1, according to some embodiments of the disclosure. Referring concurrently to FIGS. 2 and 3, in some examples, the process 200 is performed by the document reduction system 112 and/or document prioritization system 114 of the targeted medical document review system 110. The process 200 can be performed in response to receiving a request to generate a list of medical documents for targeted medical document review (e.g., from the client device 102).

At step 202, the process 200 includes receiving a list 302 of a plurality of medical documents. Each medical document is associated with a respective user of a plurality of users that are enrolled in a plan (e.g., provided by the payer or health plan provider) for which a medical document review process is performed. To provide an illustrative example, if the plan in a Medicare Advantage plan, and the medical document review process is being performed to document HCCs to CMS for a 2022 date-of-service (DOS), the list includes every medical document having a 2022 DOS that is associated with one of the users enrolled in the plans. Resultantly, the list can include hundreds of thousands to millions of medical documents.

The medical documents listed can include medical charts, clinical notes, admission and/or discharge summaries, and/or other similar records or documentation from healthcare providers that can potentially include a condition (e.g., an HCC) included therein. The medical documents are identified within the list based on document metadata (e.g., a file name, a file property, or a storage location) or other similar identifying information. The medical documents themselves have not yet been retrieved for the medical document review process.

At step 204, the process 200 includes receiving a dataset 306 for each medical document of the plurality of medical documents. The dataset 306 for each medical document includes clinical data 308, membership data 310, and/or provider data 312 associated with the respective user. Various types of information can be inferred from a processing of the dataset 306, described in turn below. In some examples, the document reduction system 112 receives the list 302, along with the clinical data 308, membership data 310, and/or provider data 312 associated with each of the users from one or more of the data stores 118, and generates the dataset 306 for each medical document as part of a data collection process 304. In other examples, the dataset 306 for each medical document is generated by another system or device and is received by the document reduction system 112.

Example types of the clinical data 308 associated with a respective user include suspect data, laboratory data, pharmaceutical data, and metadata of one or more medical documents of the respective user. The suspect data can include past diagnoses and/or HCCs corresponding to the past diagnoses of the respective user. Gaps in documentation can be inferred from the suspect data. For example, if the respective user had a chronic condition corresponding to an HCC that was documented in a past year, but the corresponding HCC has not yet been documented in a current year, there is likely missing documentation (e.g., there is a medical document having an undocumented condition) given the persistent nature of chronic conditions.

The laboratory data includes types of laboratory tests the respective user has undergone and/or results of the laboratory tests. Diagnoses of the respective user can be inferred from the laboratory data. For example, if the respective user has undergone a hemoglobin A1c (HbA1C) test and the A1c level is above a predefined threshold, diabetes can be inferred, which corresponds to a HCC. The pharmaceutical data includes a number of medications (e.g., a national drug code (NDC) count), types of medications (e.g., drug classes) and/or dosages of medications the respective user has been prescribed and/or filled, as well as a recency of prescription.

Similar to the laboratory data, diagnoses of the respective user can be inferred from the pharmaceutical data. For example, if the respective user has a prescription for insulin, diabetes can again be inferred.

The metadata of the medical documents includes a file name, one or more file properties, and/or a storage location from which healthcare provider details, such as a provider specialty and/or a provider state can be identified. The provider specialty is the provider's area of practice in the healthcare field, such as neurology, cardiology, hematology, etc. A given specialty tends to diagnose certain conditions that would otherwise not be documented through prospective processes performed by one or more prospective programs. Therefore, medical documents associated with providers having specialties are more likely to include undocumented conditions. For example, a hematologist is a specialist that diagnoses blood cancers. A medical document associated with a hematologist is therefore likely to include a blood cancer related diagnosis that no other healthcare providers would have previously diagnosed, and thus the HCC corresponding to the diagnosis would not have been previously documented. The provider state may be indicative of patterns or trends of provider behavior and/or documentation practices that are specific to the state and/or region of the country.

The membership data 310 includes health plan information associated with each of the plurality of users. Example plan information includes claims data, monthly MMR data, and MOR data. The claims data is associated with one or more claims submitted in associated with healthcare provider visits. The claims data can include a number of healthcare provider visits and, for each healthcare provider visit, a visit type (e.g., in-patient, out-patient, emergency, etc.), a duration (e.g., a length of stay), procedures performed, and/or any diagnoses included in the respective claim. The MMR data is generated and provided by CMS. The MMR data includes one or more most recent risk adjustment factor (RAF) scores of the respective member. The higher the RAF score, the higher the risk associated with the respective user. The MOR data is also generated and provided by CMS. The MOR data includes one or more HCCs for each of the plurality of users that were used to calculate the most recent RAF scores for the users. The MOR data may also include user demographic data, such as an age and/or sex of the users.

The provider data 312 includes information about a healthcare provider of the respective user that is specifically associated with the medical document (e.g., the medical document was generated as a result of the user's visit with the healthcare provider). Example healthcare provider information includes demographic, behavioral, and/or other similar characteristics of the healthcare providers, such as age, education level, and a proxy for a comfortability and/or level of skill with technology. The provider data 312 can be leveraged to determine a correlation between providers and their patient demographics (e.g., a provider of a given demographic tends to see a large number of patients with high risk conditions).

In some examples, the dataset 306 for each medical document also includes SDoH data of the respective user and/or data from one or more prospective programs. The SDoH data can include characteristics of the respective user, such as income, educational level, employment, language and literacy skills, as well as access to health care, safe housing, nutritious foods, and physical activity opportunities, among other similar examples, that can affect health. The prospective program data includes conditions (e.g., HCCs) that have already been documented via the prospective programs to CMS for one or more of the plurality of users. Example prospective programs include Housecall, In-office Assessment, and Tele-health.

At step 206, the process 200 includes, for each medical document of the plurality of medical documents, determining, using a trained first machine learning model 314, whether the medical document includes an undocumented condition based on the dataset 306 for the medical document. In one example, the datasets 306 for the medical documents are consecutively provided as input to the first machine learning model 314 for processing, and undocumented condition determinations 316 (e.g., presence or absence of undocumented conditions included in the medical documents) are received as output from the first machine learning model 314. In other examples, the datasets 306 for the medical documents are processed in parallel. As an illustrative example, for a large number of medical documents to be processed, the medical documents and corresponding datasets 306 are divided into clusters of a same or similar size that are processed in parallel by the first machine learning model 314. The outputs of the individual clusters are then combined to generate a final output of the first machine learning model 314. An undocumented condition is a diagnosis that corresponds to a reportable condition, such as an HCC, that has not yet been documented to the appropriate entity, such as CMS, in a current reporting time period (e.g., a given DOS). Each of the above-described example data types included in the clinical data 308, membership data 310, provider data 312, SDoH data, and/or prospective program data of the dataset 306 can be independent variables or features that are provided as input to and processed by the first machine learning model 314 to yield the undocumented condition determination 316 (e.g., by leveraging information that can be inferred from the independent variables).

As described in greater detail below, the first machine learning model 314 is a classification model trained to predict a presence (1) or absence (0) of an undocumented condition in a medical document. Example classification algorithms that can be implemented by the first trained machine learning model include random forest, XGBoost, deep learning artificial neural networks, among other similar classification algorithms. In some examples, the output of the first trained machined learning model is a probability (from 0 to 1) that a given medical document includes the undocumented condition. A predefined threshold can then be applied to yield a prediction of one of the two classes: presence or absence of the undocumented condition. For example, if the predefined threshold is 0.5, a probability less than 0.5 yields a predicted absence of the undocumented condition and a probability equal to or greater than 0.5 yields a predicted presence of the undocumented condition.

At step 208, the process 200 includes reducing the list 302 to a subset of the plurality of medical documents determined to include an undocumented condition. For example, the undocumented condition determinations 316 are provided along with the list 302 as inputs to a reduction process 318 performed by the document reduction system 112. The reduction process 318 includes removing, based on the undocumented condition determinations 316, one or more of the medical documents classified as being absent of (not including) any undocumented condition from the list 302 to generate a reduced list 320 identifying only the subset of the medical documents determined to include an undocumented condition. The reduced list 320 is then provided as input to one or more other processes. For example, the reduced list 320 can be provided to the document prioritization system for further processing, as described below in steps 210-214. Additionally or alternatively, the reduced list 320 can be provided as input to the medical document review process. In some examples, if the reduced list 320 is provided to the medical document review process, the process 200 can end (e.g., the process 200 does not proceed to steps 210-214). In such examples, the targeted document review is performed using only a one-model approach.

At step 210, the process 200 includes, for each medical document of the subset of the plurality of medical documents, determining, using a trained second machine learning model 326, a risk score associated with the medical document (e.g., risk score determinations 328) based on at least the dataset 306 for the medical document. The risk scores are continuous values, where the higher the risk score, the higher a risk associated with the medical document, and thus the respective user.

For example, for each medical document included in the reduced list 320, the document prioritization system 114 performs a data collection process 322 to retrieve a subset of the plurality of datasets 306 received and/or generated by the document reduction system 112 that correspond to the subset of medical documents included in the reduced list 320 (e.g., a subset 324 of the datasets 306). Therefore, each dataset in the subset 324 of the datasets includes the clinical data 308, membership data 310, provider data 312, SDoH data, and/or prospective program data.

As described in greater detail below, the second machine learning model 326 is a regression model trained to predict risk scores associated with medical documents. Example regression algorithms that can be implemented by the second machine learning model 326 include random forest regressor, XGBoost regressor, deep learning artificial neural networks, among other similar regression algorithms. In one example, the subset 324 of the datasets 306 for the subset of medical documents determined to include an undocumented condition are consecutively provided as input to the second machine learning model 326 for processing, and risk score determinations 328 associated with the subset of medical documents are received as output from the second machine learning model 326. In other examples, the subset 324 of the datasets 306 for the subset of medical documents determined to include an undocumented condition are processed in parallel. As an illustrative example, the subset of medical documents and corresponding subset 324 of the datasets 306 are divided into clusters of a same or similar size that are processed in parallel by the second machine learning model 326. The outputs of the individual clusters are then combined to generate a final output of the second machine learning model 326.

In some examples, the subset 324 of the datasets 306 are processed by the trained second machine learning model 326 to determine a risk score for each medical document in the subset of medical documents. For example, each of the above-described example data types included in the clinical data 308, membership data 310, and/or provider data 312, SDoH data, and/or prospective program data of the subset 324 of the datasets 306 can be independent variables that are provided as input to and processed by the trained second machine learning model 326 to yield the risk score (e.g., by leveraging information that can be inferred from the independent variables). In some examples, the determined risk score can include any indication representative of risk associated with a medical document, including numeric values or an indication of "high," "medium," or "low," based on a range in which the risk score output by the second machine leaning model 326 falls, for example.

In one embodiment, the risk score is a total weighted HCC value for the respective medical document. The weighted aspect of the total weighted HCC value can be based on one or more of a plurality of weights assigned to a plurality of risk factors. The assigned weights can be defined by a documentation authority, such as CMS, and can be specific to a particular plan associated with the medical document review process, such as the Medicare Advantage plan. For example, the assigned weights are the same weights used by CMS to project the expected risk and future annual cost of care for each Medicare Advantage plan enrollee, which is further used to determine payments to the Medicare Advantage plans. The values of the assigned weights can be current values for a given documentation time period (e.g., the DOS in which the medical documents fall).

In some examples, the risk factors can include one or more risk factor categories, each having a plurality of related entries, and a weight is assigned to each entry within a given risk factor category. At least one example risk factor category is associated with types of diagnoses or conditions (e.g., corresponding to HCCs). Other example risk factor categories are associated with user demographics (e.g., user age and/or sex), severity of conditions (e.g., severe illness in addition to certain types of HCCs), duration of user enrollment in the plan (e.g., number of months of enrollment), and/or prescription drug use (e.g., types of agents and/or combination of agents and certain types HCCs), among other examples. Additionally, the plan can include a plurality of plan types (e.g., platinum, gold, silver, bronze, catastrophic), and multiple different weights are assigned to each entry within the risk factor category based on the plan type. Therefore, a plurality of different risk factor weights can be applicable to a given medical document. For example, a first risk factor weight associated with a type of the one or more conditions included therein, a second risk factor weight associated with the respective user's age and weight, and so on.

At step 212, the process 200 includes ordering the subset of the plurality of medical documents in the reduced list 320 based on the determined risk score for each medical document of the subset (e.g., based on the risk score determinations 328). For example, the risk score determinations 328 for the subset of the medical documents determined to include an undocumented condition are provided along with the reduced list 320 as inputs to an ordering process 330 performed by the document reduction system 112. The ordering process 330 includes ordering, based on the risk score determinations 328, the subset of medical documents within the reduced list 320 from a highest risk score to a lowest risk score to generate an ordered, reduced list 332. The ordered, reduced list 332 can then be provided as input to one or more other processes 334. For example, at step 214, the process includes providing the ordered, reduced list 332 as an input to the medical document review process (e.g., one of the other processes 334).

As one non-limiting example, the payer system 108 and/or the targeted medical document review system 110 generates a notification, alert, or other similar message for transmission to the client device 102 of the medical document review team member over the network 104. For example, the notification is transmitted as a response to the request received from the client device 102. The notification includes at least an indication that the order, reduced list 332 is now accessible (e.g., through the payer system 108 and/or the targeted medical document review system 110) for use in the medical document review process. In some examples, the notification itself includes the order, reduced list 332. The client device 102 can initiate the medical document review process by causing a retrieval of the subset of medical documents included in the ordered, reduced list 332 from relative storage locations of the respective medical documents (e.g., included in the metadata identifying the medical documents) and pre-processing the retrieved medical documents (e.g., applying optical recognition techniques) for subsequent processing by coding members of the medical document review team in the order specified in the ordered, reduced list 332.

Conventionally, the medical document review process involves the retrieval and processing (e.g., coding) of all the medical documents included in the list 302 to: (1) determine whether there are any conditions included in each medical document, (2) if so, determine whether those conditions have already been documented, and (3) document any undocumented conditions. The list 302 can include millions of medical documents, of which 85-90% of these medical documents do not have any undocumented conditions. The retrieval and processing of the medical documents can include downloading and/or uploading of the medical documents to a local computing device (e.g., client device 102), performing optical recognition techniques on the medical documents to prepare for processing, etc., which consumes an exorbitant amount of computing resources when performed for this large of volume of medical documents. In contrast, by utilizing the ordered, reduced list 332, only the subset of the medical documents predicted to include undocumented conditions are retrieved for processing and documentation. Therefore, a significantly lesser volume of medical documents are retrieved and processed in the medical document review process.

Additionally, those medical documents within the subset that are associated with the highest risk are ordered at a top of the ordered, reduced list 332 to prioritize retrieval, processing, and documentation of those medical documents in the medical document review process. Such prioritization may enable earlier identification and documentation of higher-risk undocumented conditions (e.g., about 3-4 months earlier than if conventional medical document review process was performed). Earlier identification and documentation may provide improved healthcare management to the users enrolled in the plan by, for example, providing proactive and holistic care interventions to prevent incident and/or episodes that could have occurred had the condition not been detected early in the medical document review process. To provide an illustrative example, after the retrieval, processing, and documentation of a medical document including an undocumented condition, a healthcare provider is notified and the healthcare provider engages with the associated user of the medical document via proactive interventions, such as specialist referrals, condition management programs, etc. to manage the condition earlier to mitigate worsening of the condition.

Accordingly, certain aspects of this disclosure include reducing a number of medical documents and prioritizing higher risk medical documents for retrieval and processing to enable targeted medical document review. The process 200 described above is provided merely as an example, and can include additional, fewer, different, or differently arranged steps than depicted in FIG. 2. For example, the process 200 describes targeted medical document review using both the first machine learning model 314 and the second machine learning model 326 in conjunction with one another (e.g., the two-model approach). In other examples, the trained first machine learning model 314 and/or the trained second machine learning model 326 can be implemented independently of one another (e.g., a one-model approach). For example, when the trained first machine learning model 314 is implemented independently, the process 200 includes steps 202-208, where the reduced list 320 generated at step 208 is provided as an input to the medical document review process.

Figure 4:
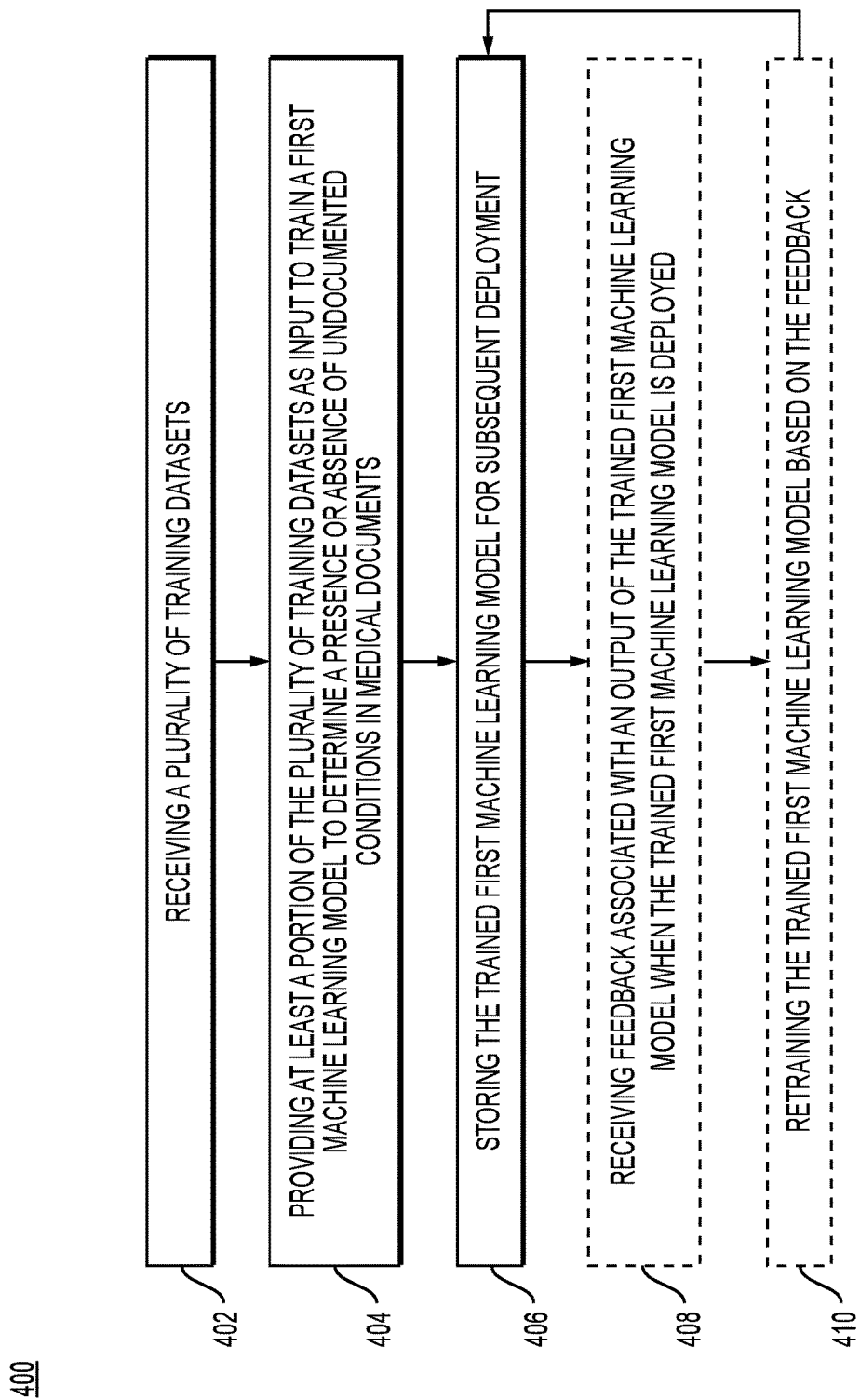
FIG. 4 is flow chart showing an example of a process for training a first machine learning model of the two-model approach, according to some embodiments of the disclosure.
Figure 5:
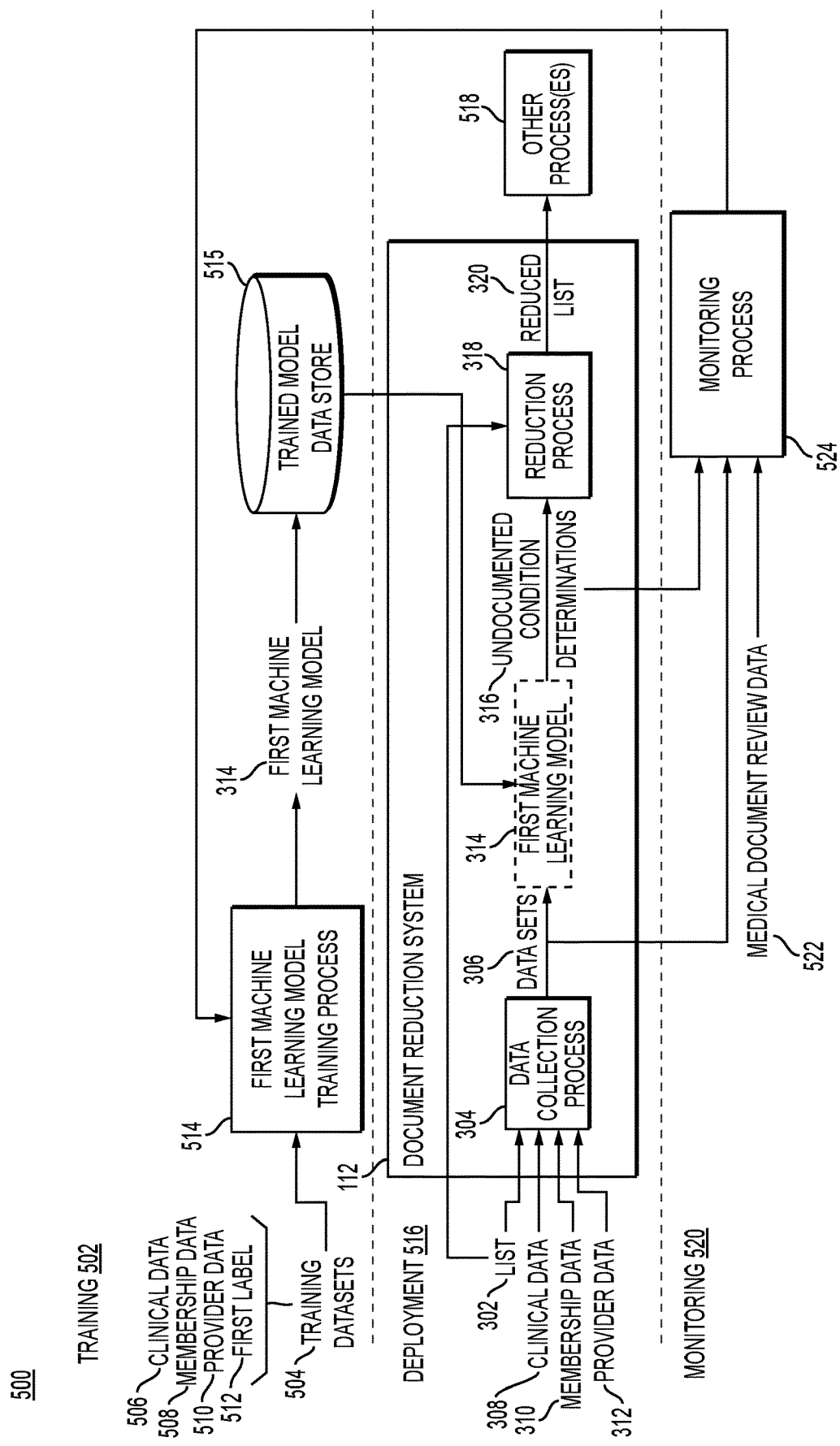
FIG. 5 is a diagram conceptually showing an example of a process for training, using, and monitoring the first machine learning model, according to some embodiments of the disclosure.

FIG. 4 is flow chart showing an example of a process 400 for training the first machine learning model 314 of the two-model approach, according to some embodiments of the disclosure. The process 400 is provided merely as an example, and can include additional, fewer, different, or differently arranged aspects than depicted in FIG. 4. In some embodiments, the document reduction system 112 performs the process 400 to train the first machine learning model 314. In other embodiments, a system or device other than the document reduction system 112 performs the process 400 to train the first machine learning model 314. The trained first machine learning model 314 is then provided to the document reduction system 112 for deployment. In some examples, the trained first machine learning model 314 can be monitored upon deployment and updated and/or re-trained based on the monitoring to improve an accuracy of the first machine learning model 314. FIG. 5 is a diagram 500 conceptually showing an example of a process for training 502, deployment 516, and monitoring 520 of the first machine learning model 314, according to some embodiments of the disclosure.

Referring concurrently to FIGS. 4 and 5, at step 402, the process 400 includes receiving a plurality of training datasets 504. Each training dataset 504 is associated with a medical document of a user, and includes clinical data 506, membership data 508, and provider data 510 associated with the user, and at least one label (e.g., a first label 512). The user was at least previously enrolled in the plan for which the targeted medical document review process is to be performed using the two-model approach. The medical document of the user is a previously reviewed medical document that has been reviewed via a medical document review process performed for a previous documentation time period during which the user was enrolled in the plan (e.g., a previous DOS). To provide an illustrative example, the previously reviewed medical document is a medical document that was retrieved and coded as part of a retrospective medical document review process performed in 2021 for medical documents having a 2020 DOS. The clinical data 506, the membership data 508, and the provider data 510 associated with the user includes data available up to the time period that the medical document was reviewed (e.g., up to the previous year). Types of the clinical data 506, the membership data 508, and the provider data 510 included in the training dataset 504 are the same or similar to the types of the clinical data 308, the membership data 310, and the provider data 312 of the datasets 306 described above with reference to FIGS. 2 and 3. In some examples, additional information such as SDoH data associated with the user, or prospective program data is also included in the training dataset 504. The first label 512 indicates whether an undocumented condition was included in the previously reviewed medical document (e.g., based on the outcome of the coding).

Similar to the types of data included in the datasets 306, the various types of data included in the training datasets 504 are collected from internal and/or external resources associated with the payer system 108, healthcare provider systems, laboratory systems, pharmaceutical systems, CMS or other similar entities associated with the documentation process, and used to generate the training datasets 504. In some examples, the document reduction system 112 collects and generates the training datasets 504. In other examples, another system or device collects and generates the training datasets 504, and the document reduction system 112 receives the training datasets 504 for the other system or device.

At step 404, the process 400 includes providing at least a portion of the plurality of training datasets 504 as input to train the first machine learning model 314 to determine a presence or absence of undocumented conditions in medical documents. In some examples, another portion of the training datasets 504 are withheld to test and/or validate the first machine learning model 314. The first machine learning model 314 is a classification model. Example classification algorithms that can be implemented by the first trained machine learning model include random forest, XGBoost, deep learning artificial neural networks, among other similar classification algorithms.

For training 502, the training datasets 504 are provided as inputs to a first machine learning model training process 514 to generate (e.g., build) the first machine learning model 314 to determine a presence or absence of undocumented conditions in medical documents. Generally, a model includes a set of variables, e.g., nodes, neurons, filters, etc., that are tuned, e.g., weighted or biased, to different values via the application of the training datasets 504.

In some examples, the first machine learning model training process 514 employs supervised learning processes to train the model (e.g., to result in the first machine learning model 314). When supervised learning processes are employed, labels or scores, such as the above-described first label 512, facilitate the learning process by providing a ground truth. Training proceeds by feeding the clinical data 506, the membership data 508, and the provider data 510 (and optionally SDoH data and/or prospective program data) included in one of the training datasets 504 associated with a previously reviewed medical document (e.g., a sample) into the model, the model having variables set at initialized values, e.g., at random, based on Gaussian noise, a pretrained model, or the like. The model outputs a predicted presence (1) or absence (0) of an undocumented condition in the previously reviewed medical document for the sample. The output is compared with the corresponding first label 512 for the training dataset 504 (e.g., the ground truth) that indicates whether the previously reviewed medical document actually did or did not include an undocumented condition to determine an error, which is then back-propagated through the model to adjust the values of the variables. This process is repeated for a plurality of samples (e.g., at least the portion of the plurality of the training datasets 504) at least until a determined loss or error is below a predefined threshold. In some examples, the other portion of the training datasets 504 that are withheld are then utilized to test and/or validate the first machine learning model. Optionally, out of time validation can be performed. In such examples, the other portions of the training datasets 504 used to test and/or validate the trained first machine learning model 314 are for medical documents associated with a different documentation time period (e.g., 2019 DOS).

In other examples, unsupervised, semi-supervised, and/or reinforcement learning processes can be used to train the model. For unsupervised learning processes, the training datasets 504 do not include pre-assigned labels or scores to aid the learning process. Rather, unsupervised learning processes include clustering, classification, or the like to identify naturally occurring patterns in the training datasets 504. Supervised or unsupervised K-means clustering or K-Nearest Neighbors can also be used. Combinations of K-Nearest Neighbors and an unsupervised cluster technique can also be used. For semi-supervised learning, a combination of the training datasets 504 with pre-assigned labels or scores (e.g., the first labels 512) and similar training datasets without pre-assigned labels or scores are used to train the model. When reinforcement learning is employed, an agent (e.g., an algorithm) is trained to make a decision regarding presence or absence of an undocumented condition in the medical document for the sample from the training datasets 504 through trial and error. For example, upon making a decision, the agent then receives feedback (e.g., a positive reward if the predicted presence or absence of an undocumented condition aligns with feedback from the medical document review process), adjust its next decision to maximize the reward, and repeat until a loss function is optimized.

Once trained, at step 406, the process 400 includes storing the trained first machine learning model 314 for subsequent deployment. For example, the trained first machine learning model 314 is stored in one of data stores 118, such as a trained model data store 515. The trained first machine learning model 314 is then retrieved from the trained model data store 515 and subsequently deployed (e.g., executed) by one of the server-side systems 106, such as the document reduction system 112. As shown in FIG. 5, during the deployment 516 of the trained first machine learning model 314, the document reduction system 112 performs steps 202-208 of the process 200, as described above in detail with reference to FIGS. 2 and 3. Briefly, the datasets 306 received for the medical documents included in the list 302 are provided as inputs to the first machine learning model 314. The first machine learning model 314 then outputs undocumented condition determinations 316 (e.g., a predicted presence or absence of an undocumented condition) for the medical documents. The undocumented condition determinations 316 and the list 302 are provided as inputs to the reduction process 318 to generate the reduced list 320 including the subset of the medical documents that, based on the undocumented condition determinations 316, include an undocumented condition. The reduced list 320 is then transmitted to one or more other ones of the server-side systems 106, such as the document prioritization system 114 for use in one or more other processes 518.

At optional step 408, the process 400 includes receiving feedback associated with an output of the trained first machine learning model 314 when the trained first machine learning model 314 is deployed. For example, during the monitoring 520 of the trained first machine learning model 314, an indication of whether the medical documents included in the list 302 actually included an undocumented condition (e.g., medical document review data 522) is collected as the feedback. In some examples, the medical document review data 522 for the subset of the medical documents determined to include undocumented conditions (e.g., the subset included in the ordered, reduced list 332) is received after the retrieval and processing of the subset of medical documents as part of the medical document review process. Additionally, a separate review process (e.g., separate from the medical document review process performed utilizing the ordered, reduced list 332) can be performed on the other medical documents that were removed from the list 302 (e.g., not included in the reduced list 320) during the reduction process 318. During a monitoring process 524, the medical document review data 522 is analyzed along with the undocumented condition determinations 316 and the datasets 306 to determine an accuracy of the undocumented condition determinations 316.

At optional step 410, the process 400 includes re-training the trained first machine learning model 314 based on the feedback. In some examples, based on the analysis of the feedback performed during the monitoring process 524, a portion of the datasets 306 and the corresponding medical document review data 522 are provided as one or more new training datasets (e.g., the corresponding medical document review data 522 serving as a label) to retrain the trained first machine learning model 314 using the first machine learning model training process 514. For example, the value of one or more variables of the trained first machine learning model 314 are adjusted. In some examples, the trained first machine learning model 314 is retrained after a predefined number of new training datasets have been received. The retrained first machine learning model 314 can then be stored for subsequent deployment (e.g., the process 400 returns to step 406).

Figure 6:
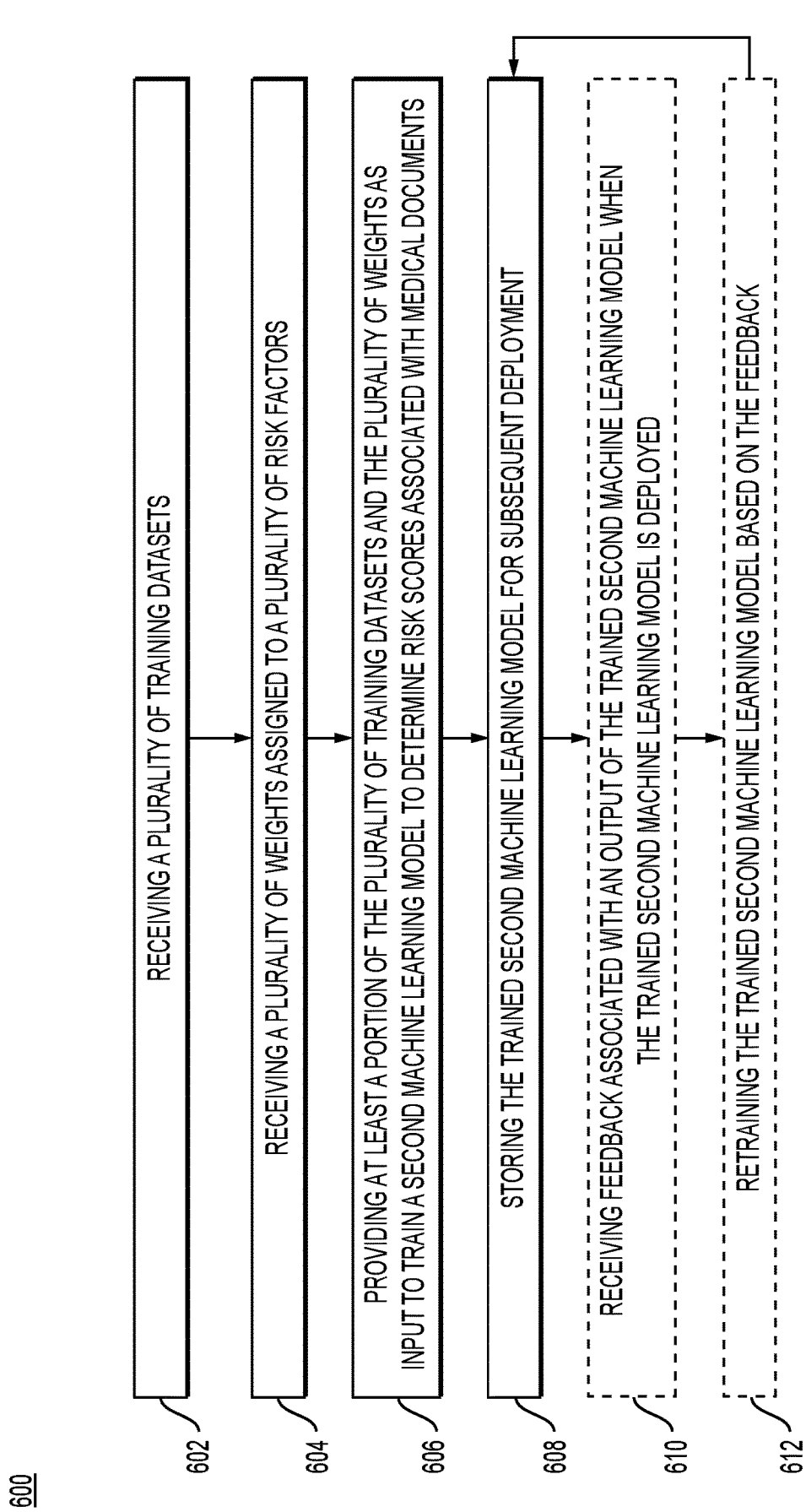
FIG. 6 is a flow chart showing an example of a process for training a second machine learning model of the two-model approach, according to some embodiments of the disclosure.
Figure 7:
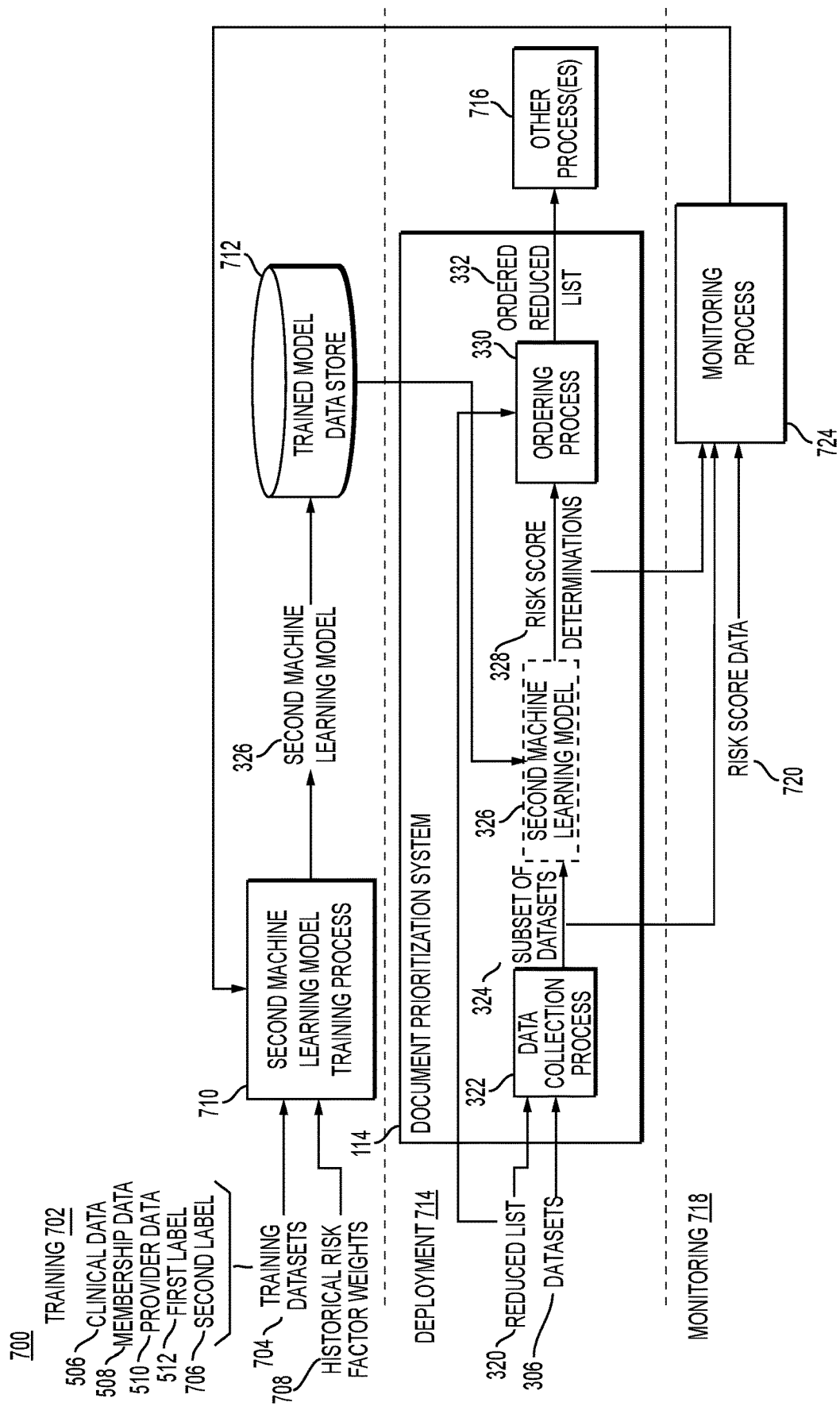
FIG. 7 is a diagram conceptually showing an example of a process for training, using, and monitoring the second machine learning model, according to some embodiments of the disclosure.

FIG. 6 is a flow chart showing an example of a process 600 for training the second machine learning model 326 of the two-model approach, according to some embodiments of the disclosure. The process 600 is provided merely as an example, and can include additional, fewer, different, or differently arranged aspects than depicted in FIG. 6. In some embodiments, the document prioritization system 114 performs the process 600 to train the second machine learning model 326. In other embodiments, a system or device other than the document prioritization system 114 performs the process 600 to train the second machine learning model 326. The trained second machine learning model 326 is then provided to the document prioritization system 114 for deployment. In some examples, the trained second machine learning model 326 can be monitored upon deployment and updated and/or re-trained based on the monitoring to improve an accuracy of the trained second machine learning model 326. FIG. 7 is a diagram 700 conceptually showing an example of a process for training 702, deployment 714, and monitoring 718 of the second machine learning model 326, according to some embodiments of the disclosure.

Referring concurrently to FIGS. 6 and 7, at step 602, the process 600 includes receiving a plurality of training datasets 704. The training datasets 704 are a subset of the training datasets 504 used for training the first machine learning model 314. Therefore, each training dataset 704 is similarly associated with a previously reviewed medical document of a user, and includes the clinical data 506, the membership data 508, and the provider data 510 associated with the user, and the first label 512. Specifically, the training datasets 704 are the subset of the training datasets 504 having the first label 512 that is indicative of the previously reviewed medical document actually including an undocumented medical condition (e.g., based on coding performed during the medical review document process). Given that the previously reviewed medical document included the undocumented medical condition that was submitted to CMS as part of the medical review document process, the medical document was also assigned a risk score by CMS. Therefore, the training datasets 704 also include a second label 706 indicating the actual risk score associated with the respective medical documents.

At step 604, the process 600 includes receiving a plurality of weights assigned to a plurality of risk factors. The risk scores determined and associated with the medical documents by CMS are weighted values that are determined based on the assigned weights. The risk factors include the same or similar types or categories of risk factors described above with reference to FIGS. 2 and 3. However, values of the weights assigned to the risk factors can change over time. For example, new values can be released annually. Therefore, the risk factor weights received at the step 604 are specifically historical risk factor weights 708 corresponding to the values for the weights that were assigned for a documentation time period in which the DOSes associated with the medical documents fall. For example, if the medical documents are medical documents that were retrieved and coded as part of a retrospective medical document review process performed in 2021 for medical documents having a 2020 DOS, then the historical risk factor weights 708 include the values for the weights released for the year 2020. In some embodiments, where the training datasets 704 are associated with medical documents that span multiple documentation time periods (e.g., one training dataset 704 is for a medical document associated with a 2020 DOS and another training dataset 704 is for a medical document associated with a 2021 DOS), historical risk factor weights 708 corresponding to each of the multiple time periods are received.

At step 606, the process 600 includes providing at least a portion of the plurality of training datasets 704 and the plurality of weights (e.g., the historical risk factor weights 708) as input to train the second machine learning model 326 to determine risk scores associated with medical documents. In some examples, another portion of the training datasets 704 are withheld to test and/or validate the trained second machine learning model 326. The second machine learning model 326 is a regression model. Example regression algorithms that can be implemented by the second machine learning model 326 include random forest regressor, XGBoost regressor, deep learning artificial neural networks, among other similar regression algorithms.

For training 702, the training datasets 704 and the historical risk factor weights 708 are provided as inputs to a second machine learning model training process 710 to generate (e.g., build) the second machine learning model 326. Generally, a model includes a set of variables, e.g., nodes, neurons, filters, etc., that are tuned, e.g., weighted or biased, to different values via the application of the training datasets 704 and corresponding historical risk factor weights 708.

In some examples, the second machine learning model training process 710 employs supervised learning processes to train the model (e.g., to result in the trained second machine learning model 326). When supervised learning processes are employed, labels or scores, such as the above-described second label 706, facilitate the learning process by providing a ground truth. Training proceeds by feeding the clinical data 506, the membership data 508, and the provider data 510 (and optionally SDoH data and/or prospective program data) included in one of the training datasets 704 that is associated with a previously reviewed medical document and the historical risk factor weights 708 corresponding to a DOS of the previously reviewed medical document (e.g., a sample) into the model, the model having variables set at initialized values, e.g., at random, based on Gaussian noise, a pre-trained model, or the like. The model outputs a predicted risk score associated with medical document for the sample. In one embodiment, the predicted risk score is a weighted HCC value for the medical document. The weighted aspect of the weighted HCC value can be based on one or more of the historical risk factor weights 708.

The output is compared with the corresponding second label 706 for the training dataset 704 (e.g., the ground truth)

that indicates the actual risk score that was assigned to the previously reviewed medical document given the risk factor(s) identified during the medical document review process and the historical risk factor weights 708 associated with the identified risk factors to determine an error, which is then back-propagated through the model to adjust the values of the variables. This process is repeated for a plurality of samples (e.g., at least the portion of the plurality of the training datasets 704) at least until a determined loss or error is below a predefined threshold. In some examples, the other portions of the training datasets 704 that are withheld are then used to further validate or test the second machine learning model 326.

In other examples, unsupervised, semi-supervised, and/or reinforcement learning processes can be employed to train the model. For unsupervised learning processes, the training datasets 704 do not include pre-assigned labels or scores to aid the learning process. Rather, unsupervised learning processes include clustering, classification, or the like to identify naturally occurring patterns in the training datasets 704. Supervised or unsupervised K-means clustering or K-Nearest Neighbors can also be used. Combinations of K-Nearest Neighbors and an unsupervised cluster technique can also be used. For semi-supervised learning, a combination of the training datasets 704 with pre-assigned labels or scores (e.g., second labels 706) and similar datasets without pre-assigned labels or scores are used to train the model. When reinforcement learning is employed, an agent (e.g., an algorithm) is trained to make a decision regarding a risk score associated with the medical document for the sample from the training datasets 504 through trial and error. For example, upon making a decision, the agent then receives feedback (e.g., a positive reward if the predicted risk score aligns with the risk score determined during the medical document review process), adjust its next decision to maximize the reward, and repeat until a loss function is optimized.

Once trained, at step 608, the process 600 includes storing the trained second machine learning model 326 for subsequent deployment. For example, the trained second machine learning model 326 is stored in one of data stores 118, such as a trained model data store 712. In some examples, the trained model data store 712 is the same data store as the trained model data store 515 configured to store the trained first machine learning model 314. In some examples, new training datasets 704 and associated historical risk factor weights 708 may be received periodically (e.g., may be received annually for a previous year DOS), and the second machine learning model 326 may be updated, modified, and/or retrained.

The trained second machine learning model 326 is then retrieved from the trained model data store 712 and subsequently deployed (e.g., executed) by one of the server-side systems 106, such as the document prioritization system 114. As shown in FIG. 7, during the deployment 714 of the trained second machine learning model 326, the document prioritization system 114 performs steps 210-214 of the process 200, as described above in detail with reference to FIGS. 2 and 3. Briefly, the subset 324 of the datasets 306 generated for the subset of the medical documents included in the reduced list 320 are provided as inputs to the trained second machine learning model 326. The trained second machine learning model 326 then outputs the risk score determinations 328 for the medical documents. The risk score determinations 328 and the reduced list 320 are provided as inputs to the ordering process 330 to generate the ordered, reduced list 332 including the subset of the medical documents ordered from a highest risk score to a lowest risk score. The ordered, reduced list 332 is then transmitted for use in one or more other processes 716, such as input for the medical document review process.

At optional step 610, the process 600 includes receiving feedback associated with an output of the trained second machine learning model 326 when the second machine learning model 326 is deployed. For example, during the monitoring 718 of the second machine learning model 326, actual risks score determined for the subset of the medical documents as part of the medical document review process (e.g., risk score data 720) are collected as the feedback. Optionally, a separate review process (e.g., separate from the medical document review process performed utilizing the ordered, reduced list 332) can be performed on the other medical documents that were removed from the list 302 (e.g., not included in the reduced list 320 and/or ordered, reduced list 332) during the reduction process 318. The separate review process can be utilized to determine an associated risk score for any of the medical documents that were incorrectly predicted as not including an undocumented condition for inclusion in the risk score data 720. During a monitoring process 724, the risk score data 720 is analyzed along with the risk score determinations 328 and the subset 324 of the datasets 306 to determine an accuracy of the risk score determinations 328.

At optional step 612, the process 600 includes re-training the trained second machine learning model 326 based on the feedback. In some examples, based on the analysis of the feedback performed during the monitoring process 724, a portion of the subset 324 of the datasets 306 and the corresponding risk score data 720 are provided as one or more new training datasets (e.g., the corresponding risk score data 720 serving as a label) to retrain the trained second machine learning model 326 using the second machine learning model training process 710. For example, the value of one or more variables of the trained second machine learning model 326 are adjusted. In some examples, trained second machine learning model 326 is retrained after a predefined number of new training datasets have been received. The retrained second machine learning model 326 can then be stored for subsequent deployment (e.g., the process 600 returns to step 608).

In general, any process or operation discussed in this disclosure that is understood to be computer-implementable can be performed by one or more processors of a computer system as described herein. A process or process step performed by one or more processors is also referred to as an operation. The one or more processors are configured to perform such processes by having access to instructions (e.g., software or computer-readable code) that, when executed by the one or more processors, cause the one or more processors to perform the processes. The instructions are stored in a memory of the computer system. A processor can be a central processing unit (CPU), a graphics processing unit (GPU), or any suitable types of processing unit.

A computer system, such as a system or device implementing a process or operation in the examples above, includes one or more computing devices. One or more processors of a computer system can be included in a single computing device or distributed among a plurality of computing devices. One or more processors of a computer system can be connected to a data storage device. A memory of the computer system includes the respective memory of each computing device of the plurality of computing devices.

FIG. 8 shows an implementation of a computer system 800 that executes techniques presented herein, according to some embodiments of the disclosure. The computer system 800 can include a set of instructions that can be executed to cause the computer system 800 to perform any one or more of the methods or computer-based functions disclosed herein. The computer system 800 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 800 operates in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while the computer system 800 is illustrated as a single system, the term "system" shall also be taken to include any collection of systems or sub-systems that individually or jointly execute a set, or multiple sets, of instructions to perform one or more computer functions.

As illustrated in FIG. 8, the computer system 800 includes a processor 802, e.g., a central processing unit (CPU), a graphics processing unit (GPU), or both. The processor 802 can be a component in a variety of systems. For example, the processor 802 is part of a standard personal computer or a workstation. The processor 802 is one or more processors, digital signal processors, application specific integrated circuits, field programmable gate arrays, servers, networks, digital circuits, analog circuits, combinations thereof, or other now known or later developed devices for analyzing and processing data. The processor 802 implements a software program, such as code generated manually (e.g., programmed).

The computer system 800 includes a memory 804 that can communicate via a bus 808. The memory 804 is a main memory, a static memory, or a dynamic memory. The memory 804 includes, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like. In one implementation, the memory 804 includes a cache or random-access memory for the processor 802. In alternative implementations, the memory 804 is separate from the processor 802, such as a cache memory of a processor, the system memory, or other memory. The memory 804 can be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein are performed by the processor 802 executing the instructions stored in the memory 804. The functions, acts or tasks are independent of the particular type of instructions set, storage media, processor or processing strategy and are performed by software, hardware, integrated circuits, firm-ware, micro-code and the like, operating alone or in combination. Likewise, processing strategies can include multiprocessing, multitasking, parallel processing, and the like.

As shown, the computer system 800 further included a display 810, such as a liquid crystal display (LCD), an organic light emitting diode (OLED), a flat panel display, a solid-state display, a cathode ray tube (CRT), a projector, a printer or other now known or later developed display device for outputting determined information. The display 810 acts as an interface for the user to see the functioning of the processor 802, or specifically as an interface with the software stored in the memory 804 or in a drive unit 806.

Additionally or alternatively, the computer system 800 includes an input/output device 812 configured to allow a user to interact with any of the components of the computer system 800. The input/output device 812 is a number pad, a keyboard, or a cursor control device, such as a mouse, or a joystick, touch screen display, remote control, or any other device operative to interact with the computer system 800.

The computer system 800 also or alternatively includes the drive unit 806 implemented as a disk or optical drive. The drive unit 806 includes a computer-readable medium 822 in which one or more sets of instructions 824, e.g., software, can be embedded. Further, the sets of instructions 824 embody one or more of the methods or logic as described herein. The instructions 824 reside completely or partially within the memory 804 and/or within the processor 802 during execution by the computer system 800. The memory 804 and the processor 802 can also include computer-readable media as discussed above.

In some systems, the computer-readable medium 822 includes the sets of instructions 824 or receives and executes the sets of instructions 824 responsive to a propagated signal so that a device connected to a network 830 can communicate voice, video, audio, images, or any other data over the network 830. Further, the sets of instructions 824 are transmitted or received over the network 830 via a communication port or interface 820, and/or using the bus 808. The communication port or interface 820 is a part of the processor 802 or is a separate component. The communication port or interface 820 is created in software or is a physical connection in hardware. The communication port or interface 820 are configured to connect with the network 830, external media, the display 810, or any other components in the computer system 800, or combinations thereof. The connection with the network 830 is a physical connection, such as a wired Ethernet connection or is established wirelessly as discussed below. Likewise, the additional connections with other components of the computer system 800 are physical connections or are established wirelessly. The network 830 is alternatively directly connected to the bus 808.

While the computer-readable medium 822 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that cause a computer system to perform any one or more of the methods or operations disclosed herein. In some examples, the computer-readable medium 822 is non-transitory, and is tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives are considered a distribution medium that is a tangible storage medium. Accordingly, the disclosure is considered to include any one or more of a computer-readable medium or a distribution medium and other equivalents and successor media, in which data or instructions are storable.

In an alternative implementation, dedicated hardware implementations, such as application specific integrated circuits, programmable logic arrays and other hardware devices, can be constructed to implement one or more of the methods described herein. Applications that include the apparatus and systems of various implementations can broadly include a variety of electronic and computer systems. One or more implementations described herein implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 is connected to the network 830. The network 830 defines one or more networks including wired or wireless networks, such as the network 104 described in FIG. 1. The wireless network can be a cellular telephone network, an 802.11, 802.18, 802.20, or WiMAX network. Further, such networks include a public network, such as the Internet, a private network, such as an intranet, or combinations thereof, and utilize a variety of networking protocols now available or later developed including, but not limited to TCP/IP based networking protocols. The network 830 can include wide area networks (WAN), such as the Internet, local area networks (LAN), campus area networks, metropolitan area networks, a direct connection such as through a Universal Serial Bus (USB) port, or any other networks that allow for data communication. The network 830 is configured to couple one computing device to another computing device to enable communication of data between the devices. The network 830 generally is enabled to employ any form of machine-readable media for communicating information from one device to another. The network 830 includes communication methods by which information may travel between computing devices. The network 830 can be divided into sub-networks. The sub-networks allow access to all of the other components connected thereto or the sub-networks restrict access between the components. The network 830 can be regarded as a public or private network connection and can include, for example, a virtual private network or an encryption or other security mechanism employed over the public Internet, or the like.

In accordance with various implementations of the present disclosure, the methods described herein are implemented by software programs executable by a computer system. Further, in one example, non-limited implementation, implementations can include distributed processing, component/object distributed processing, and parallel processing. Alternatively, virtual computer system processing can be constructed to implement one or more of the methods or functionalities as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure is implementable using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention can be practiced without these specific details. In other instances, well-known methods, structures, and techniques have not been shown in detail in order not to obscure an understanding of this description.

Thus, while there has been described what are believed to be the preferred embodiments of the invention, those skilled in the art will recognize that other and further modifications can be made thereto without departing from the spirit of the invention, and it is intended to claim all such changes and modifications as falling within the scope of the invention. For example, any formulas given above are merely representative of procedures that can be used. Functionality can be added or deleted from the block diagrams and operations are interchangeable among functional blocks. Steps can be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure further relates to the following aspects.

Example 1. A method for targeted medical document review performed by one or more processors of a computing device, the method comprising: receiving a list of a plurality of medical documents, wherein each medical document is associated with a respective user of a plurality of users enrolled in a plan for which a medical document review process is performed; receiving a dataset for each medical document of the plurality of medical documents, the dataset including clinical data, membership data, and provider data associated with the respective user; for each medical document of the plurality of medical documents, determining, using a trained first machine learning model, whether the medical document includes an undocumented condition based on the dataset for the medical document; reducing the list to a subset of the plurality of medical documents determined to include an undocumented condition; for each medical document of the subset of the plurality of medical documents, determining, using a trained second machine learning model, a risk score associated with the medical document based on the dataset for the medical document; ordering the subset of the plurality of medical documents in the reduced list based on the determined risk score for each medical document of the subset; and providing the ordered, reduced list as an input to the medical document review process.

Example 2. The method of example 1, wherein the undocumented condition is a condition corresponding to a hierarchical condition category (HCC) that has not been previously documented through one or more prospective documentation processes.

Example 3. The method of example 1 or 2, wherein the trained first machine learning model is a classification model, and the first trained machine learning model is trained by: receiving a plurality of training datasets, wherein each of the plurality of training datasets is associated with a previously reviewed medical document of a user and includes clinical data, membership data, and provider data associated with the user and at least a first label indicating whether an undocumented condition was included in the previously reviewed medical document; and providing at least a portion of the plurality of training datasets as input to train the first machine learning model to predict a presence or absence of undocumented conditions in medical documents.

Example 4. The method of example 3, wherein the second trained machine learning model is a regression model, and the second trained machine learning model is trained by: receiving a subset of the plurality of training datasets, wherein each training dataset of the subset is associated with a previously reviewed medical document of a user including an undocumented condition and further includes a second label indicating a risk score associated with the previously reviewed medical document; receiving a plurality of historical weights assigned to a plurality of risk factors for a documentation time period associated with the subset; and providing at least a portion of the subset of the plurality of training datasets and the plurality of historical weights as input to train the second machine learning model to predict risk scores associated with medical documents.

Example 5. The method of any of examples 1-3, wherein the second trained machine learning model is a regression model, and the second trained machine learning model is trained by: receiving a plurality of training datasets, wherein each training dataset of the plurality of training datasets is associated with a previously reviewed medical document of a user including an undocumented condition and further includes a second label indicating a risk score associated with the previously reviewed medical document; receiving a plurality of historical weights assigned to a plurality of risk factors for a documentation time period associated with the plurality of training datasets; and providing at least a portion of the plurality of training datasets and the plurality of historical weights as input to train the second machine learning model to predict risk scores associated with medical documents.

Example 6. The method of any of the preceding examples, wherein the determined risk score is a weighted hierarchical condition category (HCC) value based, at least in part, on one or more of a plurality of weights assigned to a plurality of risk factors.

Example 7. The method of example 6, wherein the plurality of risk factors are associated with one or more of user demographics, types of conditions, severity of conditions, duration of user enrollment in the plan, or prescription drug use.

Example 8. The method of any of the preceding examples, wherein ordering the subset of the plurality of medical documents in the reduced list includes ordering the subset of the plurality medical documents from a highest risk score to a lowest risk score.

Example 9. The method of any of the preceding examples, wherein the clinical data includes one or more of suspect data, laboratory data, pharmaceutical data, or metadata of the medical document.

Example 10. The method of any of the preceding examples, wherein the membership data includes one or more of claims data, monthly membership record (MMR) data, or model output report (MOR) data.

Example 11. The method of any of the preceding examples, wherein the provider data includes one or more of demographic data or behavioral data of a healthcare provider of the respective user that is associated with the medical document.

Example 12. The method of any of the preceding examples, wherein the dataset further includes one or more of social determinants of health data of the respective user or prospective program data.

Example 13. A system for targeted medical document review, the system comprising: one or more processors; and at least one memory storing instructions that, when executed by the one or more processors, cause the one or more processors to perform operations including: receiving a list of a plurality of medical documents, wherein each medical document is associated with a respective user of a plurality of users enrolled in a plan for which a medical document review process is performed; receiving a dataset for each medical document of the plurality of medical documents, the dataset including clinical data, membership data, and provider data associated with the respective user; for each medical document of the plurality of medical documents, determining, using a trained first machine learning model, whether the medical document includes an undocumented condition based on the dataset for the medical document; reducing the list to a subset of the plurality of medical documents determined to include an undocumented condition; for each medical document of the subset of the plurality of medical documents, determining, using a trained second machine learning model, a risk score associated with the medical document based on the dataset for the medical document; ordering the subset of the plurality of medical documents in the reduced list based on the determined risk score for each medical document of the subset; and providing the ordered, reduced list as an input to the medical document review process.

Example 14. The system of example 13, wherein the undocumented condition is a condition corresponding to a hierarchical condition category (HCC) that has not been previously documented through one or more prospective documentation processes.

Example 15. The system of example 13 or 14, wherein the trained first machine learning model is a classification model, and the first trained machine learning model is trained by: receiving a plurality of training datasets, wherein each of the plurality of training datasets is associated with a previously reviewed medical document of a user and includes clinical data, membership data, and provider data associated with the user and at least a first label indicating whether an undocumented condition was included in the previously reviewed medical document; and providing at least a portion of the plurality of training datasets as input to train the first machine learning model to predict a presence or absence of undocumented conditions in medical documents.

Example 16. The system of example 15, wherein the second trained machine learning model is a regression model, and the second trained machine learning model is trained by: receiving a subset of the plurality of training datasets, wherein each training dataset of the subset is associated with a previously reviewed medical document of a user including an undocumented condition and further includes a second label indicating a risk score associated with the previously reviewed medical document; receiving a plurality of historical weights assigned to a plurality of risk factors for a documentation time period associated with the subset; and providing at least a portion of the subset of the plurality of training datasets and the plurality of historical weights as input to train the second machine learning model to predict risk scores associated with medical documents.

Example 17. The system of any of examples 13-15, wherein the second trained machine learning model is a regression model, and the second trained machine learning model is trained by: receiving a plurality of training datasets, wherein each training dataset of the plurality of training datasets is associated with a previously reviewed medical document of a user including an undocumented condition and further includes a second label indicating a risk score associated with the previously reviewed medical document; receiving a plurality of historical weights assigned to a plurality of risk factors for a documentation time period associated with the plurality of training datasets; and providing at least a portion of the plurality of training datasets and the plurality of historical weights as input to train the second machine learning model to predict risk scores associated with medical documents.

Example 18. The system of any of examples 13-17, wherein the determined risk score is a weighted hierarchical condition category (HCC) value based at least in part on one or more of a plurality of weights assigned to a plurality of risk factors, and the plurality of risk factors are associated with one or more of user demographics, types of conditions, severity of conditions, duration of user enrollment in the plan, or prescription drug use.

Example 19. The system of any of examples 13-18, wherein ordering the subset of the plurality of medical documents in the reduced list includes ordering the subset of the plurality medical documents from a highest risk score to a lowest risk score.

Example 20. A non-transitory computer readable medium for targeted medical document review, the non-transitory computer readable medium storing instructions which, when executed by one or more processors, cause the one or more processors to perform operations comprising: receiving a list of a plurality of medical documents, wherein each medical document is associated with a respective user of a plurality of users enrolled in a plan for which a medical document review process is performed; receiving a dataset for each medical document of the plurality of medical documents, the dataset including clinical data, membership data, and provider data associated with the respective user; for each medical document of the plurality of medical documents, determining, using a trained first machine learning model, whether the medical document includes an undocumented condition based on the dataset for the medical document; reducing the list to a subset of the plurality of medical documents determined to include an undocumented condition; for each medical document of the subset of the plurality of medical documents, determining, using a trained second machine learning model, a risk score associated with the medical document based on the dataset for the medical document; ordering the subset of the plurality of medical documents in the reduced list based on the determined risk score for each medical document of the subset; and providing the ordered, reduced list as an input to the medical document review process.

What is claimed is:

1. A method for targeted medical document review performed by one or more processors, the method comprising:
receiving a list of a plurality of medical documents, wherein each medical document of the plurality of medical documents is associated with a respective user of a plurality of users enrolled in a plan for which a medical document review process is performed;
receiving a dataset for each medical document of the plurality of medical documents, the dataset including first clinical data, first membership data, and first provider data associated with the respective user, wherein the first clinical data, the first membership data, and the first provider data each include one or more data types from which information associated with an undocumented condition is inferable;
for each medical document of the plurality of medical documents, determining, using a first trained machine learning model to which the one or more data types are input as features, a classification of the medical document as having a presence or an absence of the undocumented condition in the medical document based on the dataset for the medical document, wherein the information inferable from the one or more data types and one or more first feature weights associated with the one or more data types in the first trained machine learning model are leveraged to determine the classification;
reducing the list to a first subset of a plurality of the plurality of medical documents determined as having the presence of the undocumented condition based on an output of the trained first machine learning model;
for each medical document of the first subset, determining, using a second trained machine learning model to which the one or more data types are input as features, a risk score associated with the medical document based on the dataset for the medical document, wherein the information inferable from the one or more data types and one or more second feature weights associated with the one or more data types in the second trained machine learning model are leveraged to determine the risk score;
ordering the first subset based on the determined risk score for each medical document of the first subset;
providing the ordered first subset as input to the medical document review process;
receiving, as feedback from the medical document review process, one or more of (a) an indication of whether the undocumented condition is present in each medical document of the first subset or (b) an actual risk score for each medical document of the first subset; and
generating and providing, to one or more of the first trained machine learning model or the second trained machine learning model for use in retraining, one or more new training samples from the first subset of the plurality of medical documents that, for each new training sample of the one or more new training samples, includes the dataset for a respective medical document of the first subset and the feedback for the respective medical document of the first subset, wherein the retraining includes the one or more of the first trained machine learning model or the second trained machine learning model repeatedly processing at least a portion of the one or more new training samples to cause an adjusting of one or more of the one or more first feature weights or the one or more second feature weights associated with the one or more data types until a determined loss or error associated with the one or more of the first trained machine learning model or the second trained machine learning model is below a predefined threshold.

2. The method of claim 1, wherein the undocumented condition is a condition corresponding to a hierarchical condition category (HCC) that has not been previously documented through one or more prospective documentation processes.

3. The method of claim 1, wherein the first trained machine learning model is a classification model, and the first trained machine learning model is trained by:
receiving a plurality of training datasets, wherein each of the plurality of training datasets is associated with a previously reviewed medical document of a user and includes second clinical data, second membership data, and second provider data associated with the user and at least a first label indicating whether a particular undocumented condition was included in the previously reviewed medical document; and
providing at least a portion of the plurality of training datasets as input to train the first trained machine learning model to predict a presence or absence of undocumented conditions in medical documents.

4. The method of claim 3, wherein the second trained machine learning model is a regression model, and the second trained machine learning model is trained by:
receiving a second subset of one or more of the plurality of training datasets, wherein each training dataset of the second subset is associated with the previously reviewed medical document of a the user including the first label indicating the particular undocumented condition was included in the previously reviewed medical document and further includes a second label indicating a risk score associated with the previously reviewed medical document;
receiving a plurality of historical weights assigned to a plurality of risk factors for a documentation time period associated with the second subset; and
providing at least a portion of the second subset of the plurality of training datasets and the plurality of historical weights as input to train the second trained machine learning model to predict risk scores associated with medical documents.

5. The method of claim 1, wherein the second trained machine learning model is a regression model, and the second trained machine learning model is trained by:
receiving a plurality of training datasets, wherein each training dataset of the plurality of training datasets is associated with a previously reviewed medical document of a user including a particular undocumented condition and further includes a second label indicating a risk score associated with the previously reviewed medical document;
receiving a plurality of historical weights assigned to a plurality of risk factors for a documentation time period associated with the plurality of training datasets; and
providing at least a portion of the plurality of training datasets and the plurality of historical weights as input to train the second trained machine learning model to predict risk scores associated with medical documents.

6. The method of claim 1, wherein the determined risk score is a weighted hierarchical condition category (HCC) value based, at least in part, on one or more of a plurality of weights assigned to a plurality of risk factors.

7. The method of claim 1, wherein ordering the first subset includes ordering the first subset from a highest risk score to a lowest risk score.

8. The method of claim 1, wherein the first clinical data includes one or more of suspect data, laboratory data, pharmaceutical data, or metadata of the medical document.

9. The method of claim 1, wherein the first membership data includes one or more of claims data, monthly membership record (MMR) data, or model output report (MOR) data.

10. The method of claim 1, wherein the first provider data includes one or more of demographic data or behavioral data of a healthcare provider of the respective user that is associated with the medical document.

11. The method of claim 1, wherein the dataset further includes one or more of social determinants of health data of the respective user or prospective program data.

12. The method of claim 1, wherein the first trained machine learning model is trained using a plurality of first training datasets for a plurality of first medical documents associated with a first documentation time period, and the first trained machine learning model is validated using a plurality of second training datasets for a plurality of medical documents associated with a second documentation time period, different from the first documentation time period, to perform out of time validation.

13. The method of claim 1, wherein the list includes, as part of metadata for each medical document of the plurality of medical documents, a storage location of the medical document, and the method further comprising:
    initiating the medical document review process by:
        retrieving, using the metadata, each first medical document of the ordered first subset from the storage location of the first medical document; and
        pre-processing one or more first medical documents of the ordered first subset retrieved.

14. A system for targeted medical document review, the system comprising:
    one or more processors; and
    one or more non-transitory computer readable media storing processor-executable instructions that, when executed by the one or more processors, cause the one or more processors to perform operations comprising:
        receiving a list of a plurality of medical documents, wherein each medical document of the plurality of medical documents is associated with a respective user of a plurality of users enrolled in a plan for which a medical document review process is performed;
        receiving a dataset for each medical document of the plurality of medical documents, the dataset including first clinical data, first membership data, and first provider data associated with the respective user, wherein the first clinical data, the first membership data, and the first provider data each include one or more data types from which information associated with an undocumented condition is inferable;
        for each medical document of the plurality of medical documents, determining, using a first trained machine learning model to which the one or more data types are input as features, a classification of the medical document as having a presence or an absence of the undocumented condition in the medical document based on the dataset for the medical document, wherein the information inferable from the one or more data types and one or more first feature weights associated with the one or more data types in the first trained machine learning model are leveraged to determine the classification;
        reducing the list to a first subset of a plurality of the plurality of medical documents determined as having the presence of the undocumented condition based on an output of the first trained machine learning model;
        for each medical document of the first subset, determining, using a trained second machine learning model to which the one or more data types are input as features, a risk score associated with the medical document based on the dataset for the medical document, wherein the information inferable from the one or more data types and one or more second feature weights associated with the one or more data types in the second trained machine learning model are leveraged to determine the risk score;
        ordering the first subset based on the determined risk score for each medical document of the first subset;
        providing the ordered first subset as input to the medical document review process;
        receiving, as feedback from the medical document review process, one or more of (a) an indication of whether the undocumented condition is present in each medical document of the first subset or (b) an actual risk score for each medical document of the first subset; and
        generating and providing, to one or more of the first trained machine learning model or the second trained machine learning model for use in retraining, one or more new training samples from the first subset of the plurality of medical documents that, for each new training sample of the one or more new training samples, includes the dataset for a respective medical document of the first subset and the feedback for the respective medical document of the subset, wherein the retraining includes the one or more of the first trained machine learning model or the second trained machine learning model repeatedly processing at least a portion of the one or more new training samples to cause an adjusting of one or more of the one or more first feature weights or the one or more second feature weights associated with the one or more data types until a determined loss or error associated with the one or more of the first trained machine learning model or the second trained machine learning model is below a predefined threshold.

15. The system of claim 14, wherein the undocumented condition is a condition corresponding to a hierarchical condition category (HCC) that has not been previously documented through one or more prospective documentation processes.

16. The system of claim 14, wherein the first trained machine learning model is a classification model, and the first trained machine learning model is trained by:
    receiving a plurality of training datasets, wherein each of the plurality of training datasets is associated with a previously reviewed medical document of a user and includes second clinical data, second membership data, and second provider data associated with the user and at least a first label indicating whether a particular undocumented condition was included in the previously reviewed medical document; and
    providing at least a portion of the plurality of training datasets as input to train the first trained machine learning model to predict a presence or absence of undocumented conditions in medical documents.

17. The system of claim 16, wherein the second trained machine learning model is a regression model, and the second trained machine learning model is trained by:
receiving a second subset of one or more the plurality of training datasets, wherein each training dataset of the second subset is associated with the previously reviewed medical document of the user including the first label indicating the particular undocumented condition was included in the previously reviewed medical document and further includes a second label indicating a risk score associated with the previously reviewed medical document;
receiving a plurality of historical weights assigned to a plurality of risk factors for a documentation time period associated with the second subset; and
providing at least a portion of the second subset of the plurality of training datasets and the plurality of historical weights as input to train the second trained machine learning model to predict risk scores associated with medical documents.

18. The system of claim 14, wherein the second trained machine learning model is a regression model, and the second trained machine learning model is trained by:
receiving a plurality of training datasets, wherein each training dataset of the plurality of training datasets is associated with a previously reviewed medical document of a user including a particular undocumented condition and further includes a second label indicating a risk score associated with the previously reviewed medical document;
receiving a plurality of historical weights assigned to a plurality of risk factors for a documentation time period associated with the plurality of training datasets; and
providing at least a portion of the plurality of training datasets and the plurality of historical weights as input to train the second trained machine learning model to predict risk scores associated with medical documents.

19. The system of claim 14, wherein the determined risk score is a weighted hierarchical condition category (HCC) value based at least in part on one or more of a plurality of weights assigned to a plurality of risk factors, and the plurality of risk factors are associated with one or more of user demographics, types of conditions, severity of conditions, duration of user enrollment in the plan, or prescription drug use.

20. One or more non-transitory computer readable media for targeted medical document review, the one or more non-transitory computer readable media storing instructions that, when executed by one or more processors, cause the one or more processors to perform operations comprising:
receiving a list of a plurality of medical documents, wherein each medical document of the plurality of medical documents is associated with a respective user of a plurality of users enrolled in a plan for which a medical document review process is performed;
receiving a dataset for each medical document of the plurality of medical documents, the dataset including first clinical data, first membership data, and first provider data associated with the respective user, wherein the first clinical data, the first membership data, and the first provider data each include one or more data types from which information associated with an undocumented condition is inferable;
for each medical document of the plurality of medical documents, determining, using a first trained machine learning model to which the one or more data types are input as features, a classification of the medical document as having a presence or an absence of the undocumented condition in the medical document based on the dataset for the medical document, wherein the information inferable from the one or more data types and one or more first feature weights associated with the one or more data types in the first trained machine learning model are leveraged to determine the classification;
reducing the list to a first subset of a plurality of the plurality of medical documents determined as having the presence of the undocumented condition based on an output of the first trained machine learning model;
for each medical document of the first subset, determining, using a second trained machine learning model to which the one or more data types are input as features, a risk score associated with the medical document based on the dataset for the medical document, wherein the information inferable from the one or more data types and one or more second feature weights associated with the one or more data types in the second trained machine learning model are leveraged to determine the risk score;
ordering the first subset based on the determined risk score for each medical document of the first subset;
providing the ordered first subset as input to the medical document review process;
receiving, as feedback from the medical document review process, one or more of (a) an indication of whether the undocumented condition is present in each medical document of the subset or (b) an actual risk score for each medical document of the subset; and
generating and providing, to one or more of the first trained machine learning model or the second trained machine learning model for use in retraining, one or more new training samples from the first subset of the plurality of medical documents that, for each new training sample of the one or more new training samples, includes the dataset for a respective medical document of the first subset and the feedback for the respective medical document of the first subset, wherein the retraining includes the one or more of the first trained machine learning model or the second trained machine learning model repeatedly processing at least a portion of the one or more new training samples to cause an adjusting of one or more of the one or more first feature weights or the one or more second feature weights associated with the one or more data types until a determined loss or error associated with the one or more of the first trained machine learning model or the second trained machine learning model is below a predefined threshold.

* * * * *

UNITED STATES PATENT AND TRADEMARK OFFICE
CERTIFICATE OF CORRECTION

PATENT NO. : 12,499,999 B2  
APPLICATION NO. : 18/190312  
DATED : December 16, 2025  
INVENTOR(S) : Rahul Bhaskar et al.

Page 1 of 1

It is certified that error appears in the above-identified patent and that said Letters Patent is hereby corrected as shown below:

In the Claims

In Column 31, Line 32, delete "trained first" and insert --first trained--.

In Column 32, Line 33, delete "a the" and insert --the--.

In Column 33, Line 23, between "a plurality of" and "medi-" insert --second--.

In Column 34, Line 9, delete "trained second" and insert --second trained--.

In Column 34, Line 37, after "of the" insert --first--.

In Column 35, Line 6, after "one or more" insert --of--.

In Column 36, Line 38, after "of the" insert --first--.

In Column 36, Line 39, after "of the" insert --first--.

Signed and Sealed this  
Tenth Day of February, 2026

John A. Squires  
*Director of the United States Patent and Trademark Office*